US 12,375,967 B2

(12) United States Patent
Raghavan et al.

(10) Patent No.: US 12,375,967 B2
(45) Date of Patent: Jul. 29, 2025

(54) TECHNIQUES FOR FEEDBACK METRICS ASSOCIATED WITH DUAL-POLARIZED BEAMFORMING TRANSMISSIONS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/504,977

(22) Filed: Nov. 8, 2023

(65) Prior Publication Data

US 2024/0137102 A1  Apr. 25, 2024

Related U.S. Application Data

(63) Continuation of application No. 17/351,875, filed on Jun. 18, 2021, now Pat. No. 11,843,442.

(51) Int. Cl.
*H04B 7/08* (2006.01)
*H04B 7/0456* (2017.01)
(Continued)

(52) U.S. Cl.
CPC ......... *H04B 7/088* (2013.01); *H04B 7/0456* (2013.01); *H04B 7/0617* (2013.01); *H04B 7/063* (2013.01); *H04W 16/28* (2013.01)

(58) Field of Classification Search
CPC .... H04B 7/0456; H04B 7/0617; H04B 7/063; H04B 7/0695; H04B 7/088; H04W 16/28
See application file for complete search history.

(56) References Cited

U.S. PATENT DOCUMENTS 11,843,442 B2 * 12/2023 Raghavan ............. H04B 7/063
2018/0199212 A1   7/2018 Lin et al.
(Continued)

FOREIGN PATENT DOCUMENTS

WO    WO-2018145737 A1    8/2018
WO    WO-2020032862 A1    2/2020
(Continued)

OTHER PUBLICATIONS

International Search Report and Written Opinion—PCT/US2022/030289—ISA/EPO—Sep. 9, 2022.

*Primary Examiner* — Ayaz R Sheikh
*Assistant Examiner* — David Zhijun Sun
(74) *Attorney, Agent, or Firm* — Holland & Hart LLP/QUALCOMM Incorporated

(57) ABSTRACT

Methods, systems, and devices for wireless communications are described. A user equipment (UE) may be configured to report feedback to a base station to address polarization impairments in multiple-input multiple-output (MIMO) communications. The UE and the base station may establish a communications link using a pair of orthogonally polarized beams, where the pair of polarized beams may be selected based on a beam sweep procedure. The UE may transmit a report to the base station indicating one or more polarization parameters associated with beam pairs identified in the beam sweep procedure, such as one or more orthogonality parameters, one or more polarization parameters relating to one or more beam pairs, or one or more angular spread parameters. Based on the report, the base station may transmit a beam configuration to the UE for polarization MIMO communications.

26 Claims, 21 Drawing Sheets

(51) Int. Cl.
  *H04B 7/06*      (2006.01)
  *H04W 16/28*    (2009.01)

(56)            References Cited

U.S. PATENT DOCUMENTS

| | | | |
|---|---|---|---|
| 2019/0097703 | A1 | 3/2019 | Nilsson |
| 2021/0184751 | A1* | 6/2021 | Zhao .................... H04W 24/10 |
| 2021/0281314 | A1* | 9/2021 | Zander ................. H04B 7/0404 |
| 2022/0302971 | A1* | 9/2022 | Jidhage ................ H04B 7/0802 |
| 2022/0407583 | A1 | 12/2022 | Raghavan et al. |
| 2024/0061064 | A1* | 2/2024 | Chandra ................ G01S 5/015 |

FOREIGN PATENT DOCUMENTS

| | | | |
|---|---|---|---|
| WO | WO-2021088797 A1 | 5/2021 | |
| WO | WO-2022150000 A1 | 7/2022 | |

* cited by examiner

TECHNIQUES FOR FEEDBACK METRICS ASSOCIATED WITH DUAL-POLARIZED BEAMFORMING TRANSMISSIONS

CROSS-REFERENCE TO RELATED APPLICATIONS

The present Application for Patent is a Continuation of U.S. Non-Provisional application Ser. No. 17/351,875, filed Jun. 18, 2021, which is assigned to the assignee hereof and hereby expressly incorporated by reference herein as if fully set forth below in its entirety and for all applicable purposes.

INTRODUCTION

The following relates to wireless communications, including techniques for feedback associated with the wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. In some examples, the method may include receiving, from a base station, first control signaling to initialize a beam sweep procedure. In some examples, the method may further include transmitting, to the base station, a report including one or more polarization parameters relating to a coverage region for communications between the base station and the UE, the one or more polarization parameters associated with the beam sweep procedure. In some examples, the method may further include receiving, from base station, second control signaling indicating a beam configuration for the communications between the base station and the UE, the beam configuration based on the report.

An apparatus for wireless communication at a UE is described. The apparatus may include a processor and memory coupled to the processor. In some examples, the processor and memory may be configured to receive, from a base station, first control signaling to initialize a beam sweep procedure. In some examples, the processor and memory may be further configured to transmit, to the base station, a report including one or more polarization parameters relating to a coverage region for communications between the base station and the UE, the one or more polarization parameters associated with the beam sweep procedure. In some examples, the processor and memory may be further configured to receive, from base station, second control signaling indicating a beam configuration for the communications between the base station and the UE, the beam configuration based on the report.

Another apparatus for wireless communications at a UE is described. In some examples, the apparatus may include means for receiving, from a base station, first control signaling to initialize a beam sweep procedure. In some examples, the apparatus may further include means for transmitting, to the base station, a report including one or more polarization parameters relating to a coverage region for communications between the base station and the UE, the one or more polarization parameters associated with the beam sweep procedure. In some examples, the apparatus may further include means for receiving, from base station, second control signaling indicating a beam configuration for the communications between the base station and the UE, the beam configuration based on the report.

A non-transitory computer-readable medium storing code for wireless communications at a UE is described. In some examples, the code may include instructions executable by a processor to receive, from a base station, first control signaling to initialize a beam sweep procedure. In some examples, the code may further include instructions executable by the processor to transmit, to the base station, a report including one or more polarization parameters relating to a coverage region for communications between the base station and the UE, the one or more polarization parameters associated with the beam sweep procedure. In some examples, the code may further include instructions executable by the processor to receive, from base station, second control signaling indicating a beam configuration for the communications between the base station and the UE, the beam configuration based on the report.

Some examples of the method, apparatuses, and non-transitory computer-readable medium described herein may further include operations, features, means, or instructions for transmitting, in the report, an indication of one or more angular spread parameters for the coverage region, the one or more polarization parameters including the one or more angular spread parameters.

Some examples of the method, apparatuses, and non-transitory computer-readable medium described herein may further include operations, features, means, or instructions for transmitting, in the report, an indication of one or more beam pairs based on the coverage region, the one or more polarization parameters relating to the one or more beam pairs.

In some examples of the method, apparatuses, and non-transitory computer-readable medium described herein, the one or more beam pairs include a beam pair that may be indicated based on an orthogonality parameter associated with the beam pair, the one or more polarization parameters including the orthogonality parameter.

In some examples of the method, apparatuses, and non-transitory computer-readable medium described herein, the orthogonality parameter identifies a loss in orthogonality for the beam pair.

In some examples of the method, apparatuses, and non-transitory computer-readable medium described herein, the one or more beam pairs include a first beam pair that may be selected based on the beam sweep procedure and a second beam pair that may be identified based on the one or more polarization parameters, the one or more polarization parameters including a first orthogonality parameter associated with the first beam pair, a second orthogonality parameter associated with the second beam pair, or both.

Some examples of the method, apparatuses, and non-transitory computer-readable medium described herein may further include operations, features, means, or instructions for receiving, in accordance with the beam configuration, a first message using a first beam with a first polarization and receiving, in accordance with the beam configuration, a second message using a second beam with a second polarization different from the first polarization.

Some examples of the method, apparatuses, and non-transitory computer-readable medium described herein may further include operations, features, means, or instructions for determining an orthogonality parameter associated with a beam pair that may be selected based on the beam sweep procedure, the one or more polarization parameters including the orthogonality parameter.

Some examples of the method, apparatuses, and non-transitory computer-readable medium described herein may further include operations, features, means, or instructions for comparing the orthogonality parameter with a threshold, where the report may be transmitted based on the comparing.

In some examples of the method, apparatuses, and non-transitory computer-readable medium described herein, the orthogonality parameter includes an envelope correlation coefficient corresponding to a correlation between a first component of a first electric field associated with a first beam of the beam pair and a second component of a second electric field associated with a second beam of the beam pair, the first electric field emitted at a first antenna array of the base station and the second electric field emitted at a second antenna array of the base station.

In some examples of the method, apparatuses, and non-transitory computer-readable medium described herein, the one or more polarization parameters may be based on a frequency that may be used for communications between the base station and the UE.

A method for wireless communications at a base station is described. In some examples, the method may include transmitting, to a UE, first control signaling to initialize a beam sweep procedure. In some examples, the method may further include receiving, from the UE, a report including one or more polarization parameters relating to a coverage region for communications between the base station and the UE, the one or more polarization parameters associated with the beam sweep procedure. In some examples, the method may further include transmitting, to the UE, second control signaling indicating a beam configuration for the communications between the base station and the UE, the beam configuration based on the report.

An apparatus for wireless communication at a base station is described. The apparatus may include a processor and memory coupled to the processor. In some examples, the processor and memory may be configured to transmit, to a UE, first control signaling to initialize a beam sweep procedure. In some examples, the processor and memory may be further configured to receive, from the UE, a report including one or more polarization parameters relating to a coverage region for communications between the base station and the UE, the one or more polarization parameters associated with the beam sweep procedure. In some examples, the processor and memory may be further configured to transmit, to the UE, second control signaling indicating a beam configuration for the communications between the base station and the UE, the beam configuration based on the report.

Another apparatus for wireless communications at a base station is described. The apparatus may include means for transmitting, to a UE, first control signaling to initialize a beam sweep procedure. The apparatus may further include means for receiving, from the UE, a report including one or more polarization parameters relating to a coverage region for communications between the base station and the UE, the one or more polarization parameters associated with the beam sweep procedure. The apparatus may further include means for transmitting, to the UE, second control signaling indicating a beam configuration for the communications between the base station and the UE, the beam configuration based on the report.

A non-transitory computer-readable medium storing code for wireless communications at a base station is described. In some examples, the code may include instructions executable by a processor to transmit, to a UE, first control signaling to initialize a beam sweep procedure. In some examples, the code may further include instructions executable by the processor to receive, from the UE, a report including one or more polarization parameters relating to a coverage region for communications between the base station and the UE, the one or more polarization parameters associated with the beam sweep procedure. In some examples, the code may further include instructions executable by the processor to transmit, to the UE, second control signaling indicating a beam configuration for the communications between the base station and the UE, the beam configuration based on the report.

Some examples of the method, apparatuses, and non-transitory computer-readable medium described herein may further include operations, features, means, or instructions for receiving, in the report, an indication of one or more angular spread parameters for the coverage region, the one or more polarization parameters including the one or more angular spread parameters.

Some examples of the method, apparatuses, and non-transitory computer-readable medium described herein may further include operations, features, means, or instructions for receiving, in the report, an indication of one or more beam pairs based on the coverage region, the one or more polarization parameters relating to the one or more beam pairs.

In some examples of the method, apparatuses, and non-transitory computer-readable medium described herein, the one or more beam pairs include a beam pair that may be indicated based on an orthogonality parameter associated with the beam pair, the one or more polarization parameters including the orthogonality parameter.

In some examples of the method, apparatuses, and non-transitory computer-readable medium described herein, the orthogonality parameter identifies a loss in orthogonality for the beam pair.

In some examples of the method, apparatuses, and non-transitory computer-readable medium described herein, the one or more beam pairs include a first beam pair that may be selected based on the beam sweep procedure and a second beam pair that may be identified based on the one or more polarization parameters, the one or more polarization parameters including a first orthogonality parameter associated with the first beam pair, a second orthogonality parameter associated with the second beam pair, or both.

Some examples of the method, apparatuses, and non-transitory computer-readable medium described herein may further include operations, features, means, or instructions for transmitting, in accordance with the beam configuration, a first message using a first beam with a first polarization and transmitting, in accordance with the beam configuration, a second message using a second beam with a second polarization different from the first polarization.

Some examples of the method, apparatuses, and non-transitory computer-readable medium described herein may further include operations, features, means, or instructions for determining an orthogonality parameter associated with a beam pair that may be selected based on the receiving the report, the one or more polarization parameters including the orthogonality parameter.

In some examples of the method, apparatuses, and non-transitory computer-readable medium described herein, the report includes a result of a comparison between the orthogonality parameter and a threshold.

In some examples of the method, apparatuses, and non-transitory computer-readable medium described herein, the orthogonality parameter includes an envelope correlation coefficient corresponding to a correlation between a first component of a first electric field associated with a first beam of the beam pair and a second component of a second electric field associated with a second beam of the beam pair, the first electric field emitted at a first antenna array of the base station and the second electric field emitted at a second antenna array of the base station.

In some examples of the method, apparatuses, and non-transitory computer-readable medium described herein, the one or more polarization parameters may be based on a frequency that may be used for communications between the base station and the UE.

In some examples of the method, apparatuses, and non-transitory computer-readable medium described herein, an antenna array operable to receive the first control signaling or the second control signaling, or to transmit the report, or both.

In some examples of the method, apparatuses, and non-transitory computer-readable medium described herein, an antenna array operable to transmit the first control signaling or the second control signaling, or to receive the report, or both.

DETAILED DESCRIPTION

Figure 1:
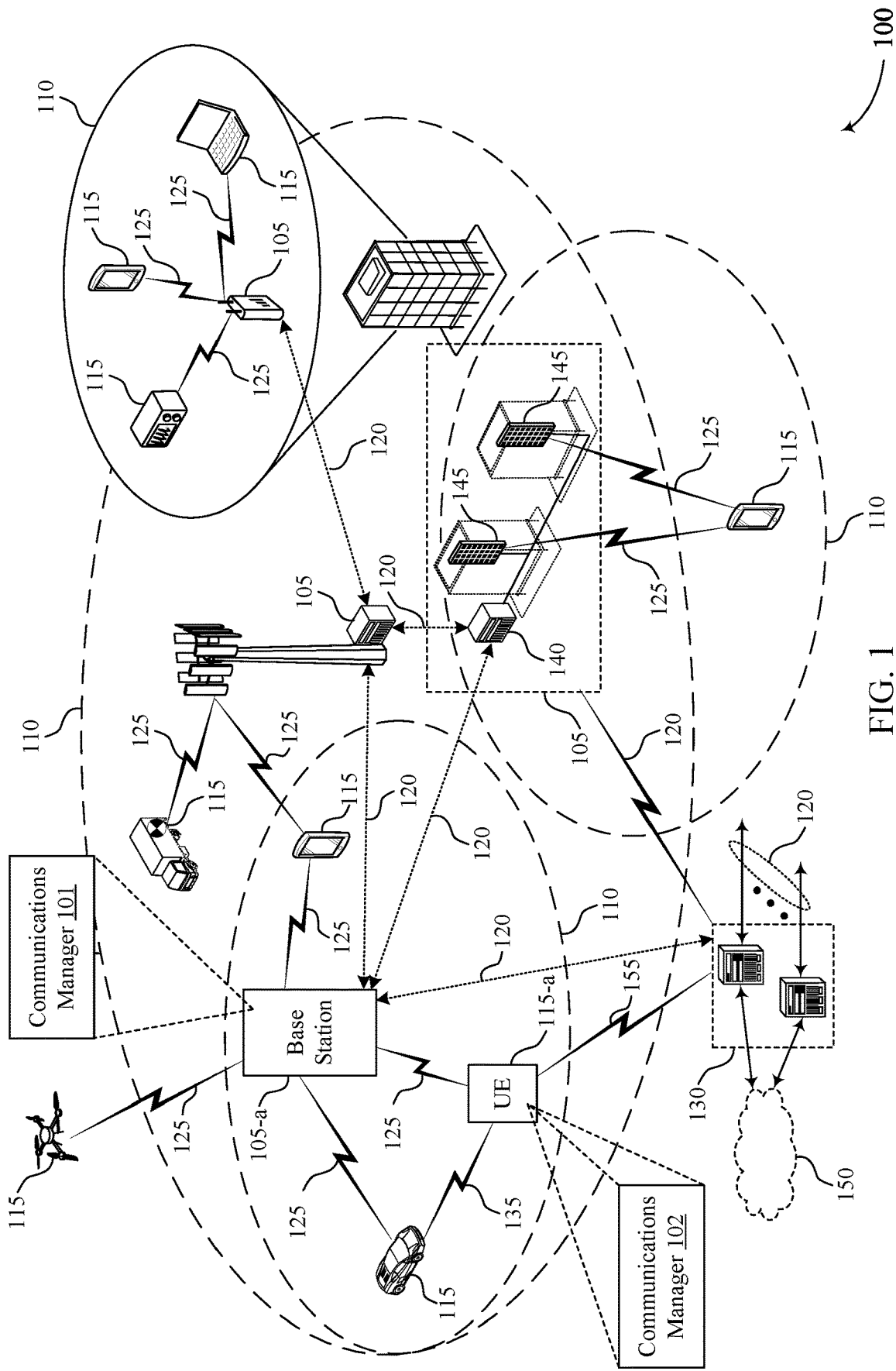
FIGS. 1 through 5 illustrate examples of wireless communications systems that support techniques for feedback metrics associated with dual-polarized beamforming transmissions in accordance with one or more aspects of the present disclosure.

Devices in a wireless communications system (e.g., a 5G-NR system) may communicate using beamforming techniques, which may also be referred to as spatial filtering, directional transmission, or directional reception. For example, a UE may communicate with a base station using beamformed transmissions in a millimeter wave (mmW) frequency spectrum. The UE or the base station may combine signals communicated via a set of antennas such that signals propagating in a first orientation with respect to the set of antennas may experience constructive interference, and signals propagating in other orientations may experience destructive interference.

In some cases, a UE or a base station may use multiple-input multiple-output (MIMO) communications to transmit or receive multiple signals via different spatial layers. The multiple signals may, for example, be transmitted or received via different antennas or different combinations of antennas. In some examples, a transmitting device (e.g., a base station) may steer two beams in a same direction to a receiving device (e.g., a UE) using polarization MIMO communications, where a first beam may have a first polarization mode that is orthogonal (e.g., perpendicular) to a second polarization mode of a second beam. Polarization MIMO communications may reduce a signaling overhead associated with beamforming techniques, as beam management may be based on a single direction rather than multiple directions in spatial MIMO communications (e.g., using spatial multiplexing). In some cases, beamformed transmissions may be distorted or attenuated at a UE for one or more directions, which may result in a loss of orthogonality between polarization modes of beams in polarization MIMO communications, where the loss in orthogonality may lead to cross-talk or interference between the beamformed transmissions.

In accordance with techniques disclosed herein, a UE may be configured to report feedback signals to a base station to address polarization impairments in MIMO communications. The UE and the base station may establish a communications link using a pair of orthogonally polarized beams, where the pair of polarized beams may be selected based on a beam sweep procedure. The UE may transmit a report to the base station indicating one or more polarization parameters associated with beam pairs identified in the beam sweep procedure. In some examples, the UE may report an angular coverage region (e.g., a set of directions from which the UE may receive beamformed transmissions) where orthogonality may be maintained between polarized beam pairs. Additionally or alternatively, the UE may report the angular region over which the selected pair of polarized beams lose orthogonality. The UE may report a metric of the orthogonality (e.g., an envelope correlation coefficient (ECC)) to indicate how much of the orthogonality is lost. In some examples, the UE may also indicate an alternate viable beam pair to the base station.

By implementing one or more of the described techniques for reporting feedback, devices of a wireless communications system may be able to effectively implement beamforming schemes based on feedback reports in a manner that increases data rates and improved latency, which may correspond to improved power consumption and thermal overhead, among other considerations.

One or more aspects of the disclosure are initially described in the context of wireless communications systems. One or more aspects of the disclosure are further illustrated by and described with reference to a field diagram, a process flow, apparatus diagrams, system diagrams, and flowcharts that relate to techniques for feedback metrics associated with dual-polarized beamforming transmissions.

FIG. 1 illustrates an example of a wireless communications system 100 that supports techniques for feedback metrics associated with dual-polarized beamforming transmissions in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the signaling and power control techniques for RF sensing procedures described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETS) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that, although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In accordance with one or more aspects of the present disclosure, the wireless communications system 100 may support feedback reporting for polarization MIMO communications. For example, a UE 115 may be configured to report feedback to a base station 105 to address polarization impairments in MIMO communications. The UE 115 and the base station 105 may establish a communications link using a pair of orthogonally polarized beams, where the pair of polarized beams may be selected based on a beam sweep procedure. The UE 115 may transmit a report to the base station 105 indicating one or more polarization parameters associated with beam pairs identified in the beam sweep procedure. In some examples, the UE 115 may report an angular coverage region (e.g., a set of directions from which the UE 115 may receive beamformed transmissions) where orthogonality may be maintained between polarized beam pairs. Additionally or alternatively, the UE 115 may report when the selected pair of polarized beams loses orthogonality. The UE 115 may report a metric of the orthogonality (e.g., an ECC) to indicate how much of the orthogonality was lost. In some examples, the UE 115 may also indicate an alternate viable beam pair to the base station 105. By implementing one or more of the described techniques for reporting feedback, devices of the wireless communications system 100 may be able to implement polarized beamforming schemes responsive to signal propagation conditions and related feedback reports, or in a manner that increases communications efficiency, or considers power consumption or processing load, among other considerations.

In some examples, a base station 105-*a* may include a communications manager 101 that is configured to support one or more aspects of the techniques for feedback metrics associated with dual-polarized beamforming transmissions described herein. For example, the communications manager 101 may be configured to support the base station 105-*a* transmitting (e.g., to a UE 115-*a*) first control signaling to initialize a beam sweep procedure. In some examples, the communications manager 101 may be configured to support the base station 105-*a* receiving (e.g., from the UE 115-*a*) a report including one or more polarization parameters (e.g., one or more orthogonality parameters, one or more polarization parameters relating to one or more beam pairs, or one or more angular spread parameters) relating to a coverage region for communications between the base station 105-*a* and the UE 115-*a*, the one or more polarization parameters associated with the beam sweep procedure. In some examples, the communications manager 101 may be configured to support the base station 105-*a* transmitting (e.g., to the UE 115-*a*) second control signaling indicating a beam configuration for the communications between the base station 105-*a* and the UE 115-*a*, the beam configuration based on the report.

In some examples, the UE 115-*a* may include a communications manager 102 that is configured to support one or more aspects of the techniques for feedback metrics associated with dual-polarized beamforming transmissions described herein. For example, the communications manager 102 may be configured to support the UE 115-*a* receiving (e.g., from the base station 105-*a*) first control signaling to initialize a beam sweep procedure. In some examples, the communications manager 101 may be configured to support the UE 115-*a* transmitting (e.g., to the base station 105-*a*) a report including one or more polarization parameters (e.g., one or more orthogonality parameters, one or more polarization parameters relating to one or more beam pairs, or one or more angular spread parameters) relating to a coverage region for communications between the base station 105-*a* and the UE 115-*a*, the one or more polarization parameters associated with the beam sweep procedure. In some examples, the communications manager 102 may be configured to support the UE 115-*a* receiving (e.g., from the base station 105-*a*) second control signaling indicating a beam configuration for the communications between the base station 105-*a* and the UE 115-*a*, the beam configuration based on the report.

Figure 2:
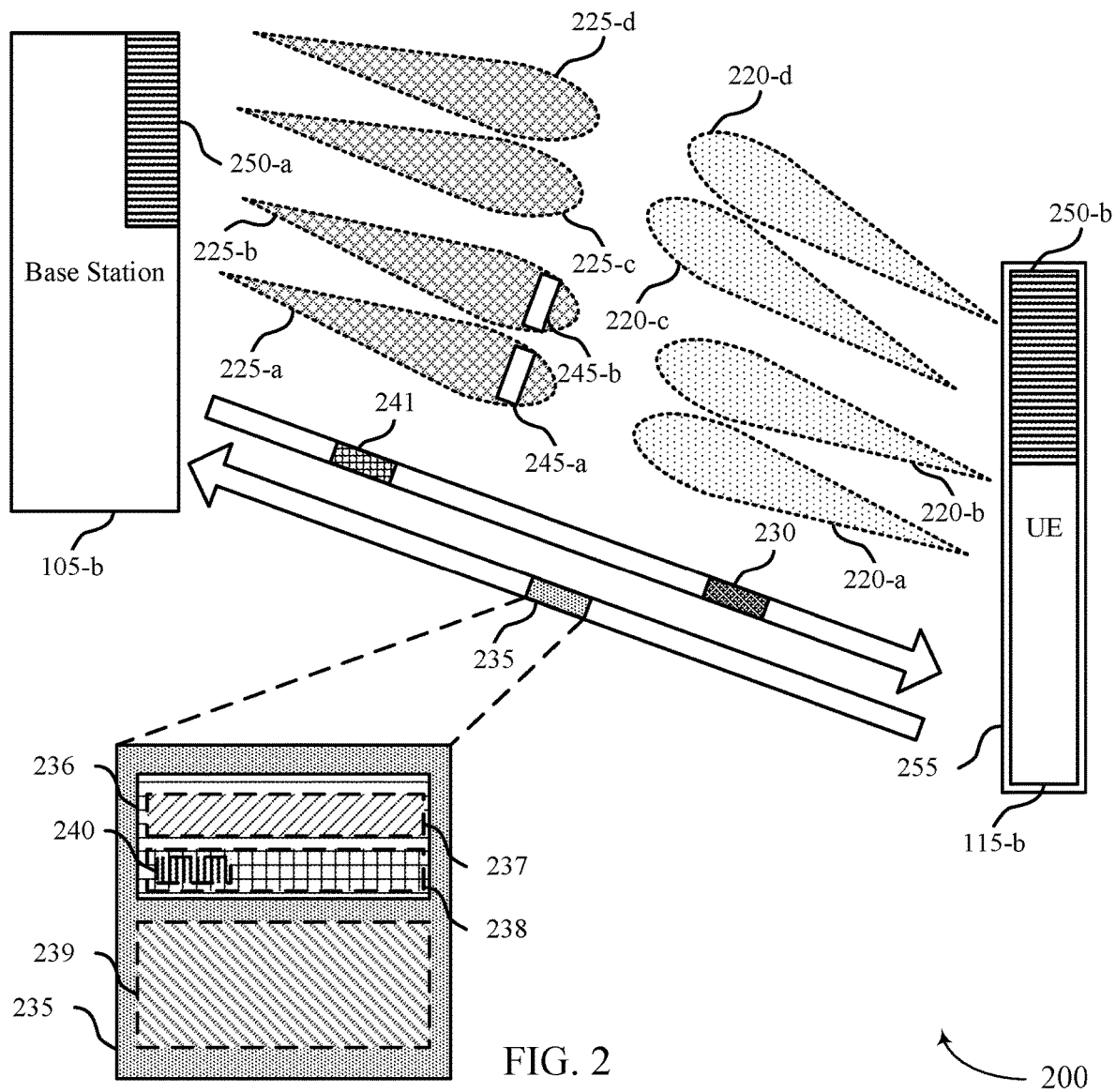

FIG. 2 illustrates an example of a wireless communications system 200 that supports techniques for feedback metrics associated with dual-polarized beamforming transmissions in accordance with one or more aspects of the present disclosure. In some examples, the wireless communications system 200 may implement aspects of the wireless communications system 100. For example, the wireless communications system 200 may include a base station 105-*b* and a UE 115-*b*, which may be examples of the corresponding devices described with reference to FIG. 1. The wireless communications system 200 may include features for improved communications between the UE 115-*b* and the base station 105-*b*, among other benefits.

The base station 105-*b* may communicate with the UE 115-*b* using beamforming techniques. The base station 105-*b* may transmit control signaling 230 to the UE 115-*b* to initialize a beam sweep procedure, where the base station 105-*b* and the UE 115-*b* may identify one or more base station beams 225 and one or more UE beams 220 for beamformed communications based on the beam sweep procedure. For example, the base station 105-*b* and the UE 115-*b* may select base station beams 225-*a* and 225-*b* from base station beams 225-*a*, 225-*b*, 225-*c*, and 225-*d* based on the beam sweep procedure. Similarly, the base station 105-*b* and the UE 115-*b* may select UE beams 220-*a* and 220-*b* from UE beams 220-*a*, 220-*b*, 220-*c*, and 220-*d* based on the beam sweep procedure.

Individual base station beams 225 may correspond to individual UE beams 220 for communications in the wireless communications system 200. In some examples, the communications illustrated in FIG. 2 may include downlink transmissions to the UE 115-*b*, where the base station beams 225 may be transmission beams and the UE beams 220 may be reception beams. Additionally or alternatively, the communications illustrated in FIG. 2 may include uplink transmissions from the UE 115-*b*, where the base station beams 225 may be reception beams and the UE beams 220 may be transmission beams.

The UE 115-*b* may train UE beams 220 to communicate in directions corresponding to a coverage region, which may increase antenna gains for transmissions sent or received by the UE beams 220 in the coverage region. In some examples, the base station 105-*b* may steer two base station beams 225-*a* and 225-*b* in a same direction to the UE 115-*b* using polarization MIMO communications, where the base station beam 225-*a* may have a first polarization mode that is orthogonal (e.g., perpendicular) to a second polarization mode of the base station beam 225-*b*. Polarization MIMO communications may reduce a signaling overhead associated with beamforming techniques, as beam management may be based on a single direction rather than multiple directions in spatial MIMO communications (e.g., using spatial multiplexing).

The base station 105-*b* may transmit signals using base station beams 225 with nominally orthogonal polarization modes. For example, the base station beams 225-*a* and 225-*b* may be linearly polarized in perpendicular orientations, such as a vertical polarization mode and a horizontal polarization mode, +45° and −45° polarization modes, or other orthogonal pairs of linear polarization modes (e.g., linear polarization modes that differ by 90°). Additionally or alternatively, the base station beams 225-*a* and 225-*b* may respectively have a left-handed (e.g., clockwise) circular polarization mode and a right-handed (e.g., counter-clockwise) circular polarization mode or orthogonal elliptical polarization modes. In some examples, the base station 105-*b* may transmit signals via additional spatial layers (e.g., 4 layers, 6 layers, or more layers) by combining polarization MIMO techniques and spatial MIMO techniques (e.g., spatial multiplexing). For example, the base station 105-*b* may transmit additional signals using the base station beams 225-*c* and 225-*d*, which may point in a different direction than the base station beams 225-*a* and 225-*b* and have nominally orthogonal polarization modes.

The base station 105-*b* may use an antenna array 250-*a* (e.g., which may include one or more antennas or antenna elements) to transmit the signals such that beam pattern responses or array gains of the base station beams 225-*a* and 225-*b* and the corresponding UE beams 220-*a* and 220-*b* may be symmetrical (or nearly symmetrical) over a coverage area or a coverage region of an antenna array 250-*b* at the UE 115-*b*. Further, the polarization modes of the base station beams 225-*a* and 225-*b* may also be orthogonal (or nearly orthogonal, where linear polarization modes may differ by an angle that is approximately 90°, such as 89° or 91°) across angles of the coverage area, for example as the base station beams 225-*a* and 225-*b* propagate through freespace (e.g., over the air). That is, polarization MIMO techniques may enable two-layer transmissions independent of an angle at which the base station beams 225-*a* and 225-*b* are steered toward (e.g., using an analog beamforming codebook that includes a set of base station beams 225, such as the base station beams 225-*a*, 225-*b*, 225-*c*, and 225-*d*) or a carrier frequency of the base station beams 225-*a* and 225-*b*. Additionally, polarization MIMO techniques may improve a beam management overhead, as the UE 115-*b* may transmit feedback (e.g., feedback related to a transmission configuration indication (TCI) state) associated with the beam pair of the base station beams 225-*a* and 225-*b*, rather than transmitting separate feedback messages for each base station beam 225. In some cases, a higher cross polarization discrimination (XPD) for the base station beams 225-*a* and 225-*b* (e.g., a ratio of a component in a same direction as the orientation of the polarization mode of the base station beam 225 to a component in a direction orthogonal to the orientation of the polarization mode) may improve cross-talk or interference between layers of the beamformed transmissions from the base station 105-*b*.

In some cases, beamformed transmissions may be distorted or attenuated at the UE 115-*b* for one or more directions, which may result in a loss of orthogonality between polarization modes of the base station beams 225-*a* and 225-*b*. In some examples, a housing material 255 (e.g., glass, aluminum) at the UE 115-*b* may have one or more frequency-dependent or angle-dependent properties that may interfere with an array response at the antenna array 250-*b* at the UE 115-*b*. For example, after passing through the housing material 255 at the UE 115-*b*, electromagnetic radiation corresponding to the base station beams 225-*a* and 225-*b* may be directed toward different directions, as the housing material 255 may have angle-dependent reflectivity properties, or attenuation properties, or both. That is, the polarization modes of the distorted base station beams 225-*a* and 225-*b* after passing through the housing material 255 at the UE 115-*b* may not be orthogonal within a coverage area of the antenna array 250-*b* at the UE 115-*b*. The loss in orthogonality may lead to cross-talk or interference between the distorted base station beams 225-*a* and 225-*b*, which may reduce a signal to interference plus noise ratio (SINR) across the layers. Additionally or alternatively, one or more components at the UE (e.g., a camera, a sensor, or another component) may introduce additional interference based on interactions with the beamformed transmissions.

In accordance with one or more aspects of the present disclosure, the wireless communications system 200 may support feedback reporting for polarization MIMO communications. For example, the UE 115-*b* may be configured to report feedback in a report 235 to the base station 105-*b* to address polarization impairments for the base station beams 225-*a* and 225-*b*. The report 235 may indicate one or more polarization parameters 236 associated with beam pairs identified in the beam sweep procedure, including the base station beams 225 and the UE beams 220 illustrated in FIG. 2. In some examples, the one or more polarization parameters 236 may include one or more angular spread parameters 237, where the one or more angular spread parameters 237 may indicate an angular coverage region where orthogonality may be maintained between the base station beams 225-*a* and 225-*b*, such as when the angular coverage region is smaller than the coverage area of the antenna array.

Additionally or alternatively, the one or more polarization parameters 236 may include an orthogonality parameter 238 that may indicate when the base station beams 225-*a* and 225-*b* lose orthogonality. For example, the orthogonality parameter 238 may include a metric of the orthogonality, such as an ECC 240, to indicate how much of the orthogonality is lost. For example, if the base station beam 225-*a* has a horizontal polarization mode in freespace and the base station beam 225-*b* has a vertical polarization mode in freespace, the ECC 240 may describe a correlation between electric field components of the base station beams 225-*a* and 225-*b* according to the formula:

$$ECC = |E_{\Theta,Vpol}{}^H E_{\Theta,Hpol}|^2 + |E_{\Phi,Vpol}{}^H E_{\Phi,Hpol}|^2, \qquad (1)$$

where $E_\Theta$ may represent a co-polarization component (e.g., a component in a same direction as the polarization mode) of an electric field of a base station beam 225, $E_\Phi$ may represent a cross-polarization component (e.g., a component orthogonal to the direction of the polarization mode) of the electric field of the base station beam 225, "Hpol" may identify the electric field components of the base station beam 225-a with the horizontal polarization mode, and "Vpol" may identify the electric field components of the base station beam 225-b with the vertical polarization mode. When the base station beams 225-a and 225-b are nearly orthogonal, the ECC 240 may be below a threshold value (e.g., near zero, where an ECC 240 equal to 0 may indicate the base station beams 225-a and 225-b are perfectly orthogonal). In some examples, the UE 115-b may compare the ECC 240 to the threshold value to determine when to transmit the report 235. In some examples, the base station 105-b or the UE 115-b may configure or determine the threshold value. Accordingly, the ECC 240 may quantify a rate loss for polarization MIMO communications using the base station beams 225-a and 225-b. In some examples, the base station 105-b may determine how to address the loss in orthogonality based on the polarization parameters 236 (e.g., the angular spread parameters 237 or the orthogonality parameter 238, including the ECC 240) included in the report 235 from the UE 115-b.

In some examples, the UE 115-b may include a beam pair indication 239 in the report 235 to indicate an alternate viable beam pair (e.g., a pair of base station beams 225 (not shown) other than the base station beams 225-a and 225-b) to the base station 105-b, in addition to reporting the loss in orthogonality of the base station beams 225-a and 225-b. In some examples, the UE 115-b may include the beam pair indication 239 in the report 235 based on determining that the alternate beam pair may maintain orthogonality.

Based on the report 235, the base station 105-b may transmit a beam configuration 241 to the UE 115-b. In some examples, the beam configuration 241 may identify a beam pair (e.g., the base station beams 225-a and 225-b) and one or more beam configuration parameters for reliable polarization MIMO communications with the UE 115-b. Based on the beam configuration 241, the UE 115-b may train or steer the UE beams 220-a and 220-b according to a receive configuration to receive one or more messages 245 from the base station 105-b. For example, the base station 105-b may transmit a message 245-a using the base station beam 225-a and a message 245-b using the base station beam 225-b, where the base station beam 225-a may have a first polarization mode (e.g., a horizontal polarization mode) and the base station beam 225-b may have a second polarization mode (e.g., a vertical polarization mode) that is orthogonal to the first polarization mode. By implementing one or more of the described techniques for reporting feedback, devices of the wireless communications system 200 may be able to implement polarized beamforming schemes responsive to signal propagation conditions and the report 235, or in a manner that increases communications efficiency, or considers power consumption or processing load, among other considerations.

Figure 3:
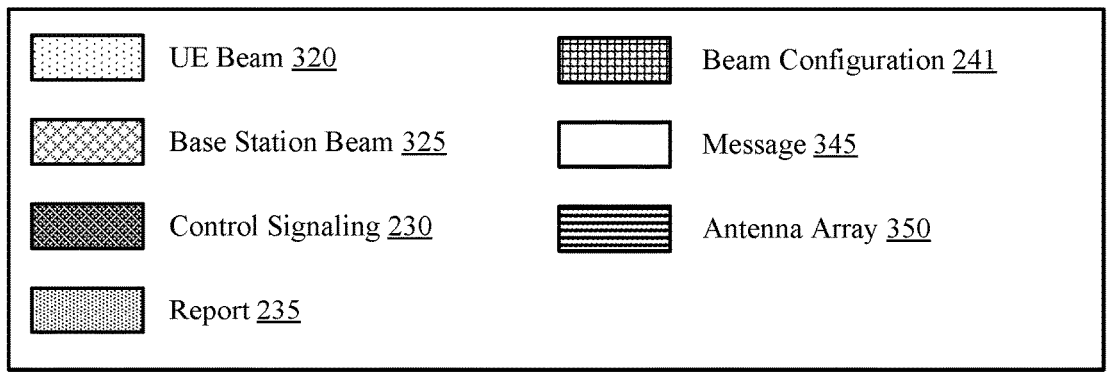
Figure 3:
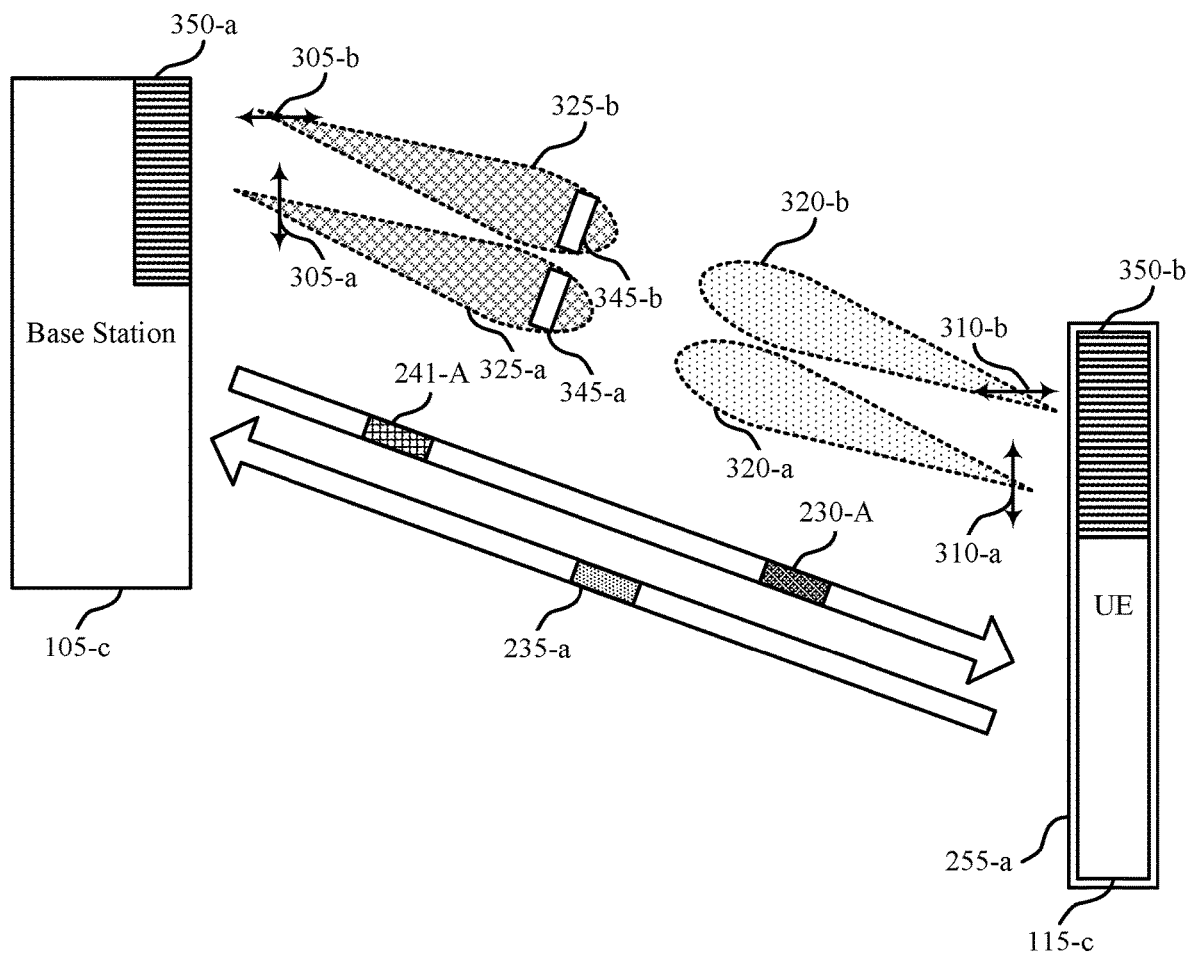

FIG. 3 illustrates an example of a wireless communications system 300 that supports techniques for feedback metrics associated with dual-polarized beamforming transmissions in accordance with one or more aspects of the present disclosure. In some examples, the wireless communications system 300 may implement aspects of the wireless communications system 100. For example, the wireless communications system 300 may include a base station 105-c and a UE 115-c, which may be examples of the corresponding devices described with reference to FIG. 1. The wireless communications system 300 may include features for improved communications between the UE 115-c and the base station 105-c, among other benefits.

The base station 105-c may transmit control signaling 230-a to the UE 115-c to initialize a beam sweep procedure, where the base station 105-c and the UE 115-c may identify one or more base station beams 325 and one or more UE beams 320 for beamformed communications based on the beam sweep procedure. In some examples, based on the beam sweep procedure, the base station 105-c may steer two base station beams 325-a and 325-b in a same direction to the UE 115-c using polarization MIMO communications, where the base station beam 325-a may have a first polarization mode 305-a that is orthogonal (e.g., perpendicular) to a second polarization mode 305-b of the base station beam 325-b. The UE 115-c may train UE beams 320 to communicate in directions corresponding to a coverage region, which may increase antenna gains for transmissions sent or received by the UE beams 320 in the coverage region. Polarization MIMO communications may reduce a signaling overhead associated with beamforming techniques, as beam management may be based on a single direction rather than multiple directions in spatial MIMO communications (e.g., using spatial multiplexing).

The base station 105-c may transmit signals using base station beams 325 with nominally orthogonal polarization modes 305. For example, the base station beams 325-a and 325-b may be linearly polarized in perpendicular orientations, where the base station beam 325-a may have a vertical polarization mode 305-a and the base station beam 325-b may have a horizontal polarization mode 305-b. The base station 105-c may use an antenna array 350-a (which may be an example of an antenna array 350-a described with reference to FIG. 2) to transmit the signals such that beam pattern responses or array gains of the base station beams 325-a and 325-b and the corresponding UE beams 320-a and 320-b may be symmetrical (or nearly symmetrical) over a coverage area or a coverage region of an antenna array 350-b at the UE 115-c. Further, the polarization modes 305 of the base station beams 325-a and 325-b may also be orthogonal (or nearly orthogonal, where linear polarization modes 305 may differ by an angle that is approximately 90°, such as 89° or 91°) across angles of the coverage area, for example as the base station beams 325-a and 325-b propagate through freespace (e.g., over the air). In some examples, the UE beams 320 may be configured such that the UE beams 320 have reception polarization modes 310 that match the polarization modes 305 of the corresponding base station beams 325. For example, as illustrated in FIG. 3, the UE beam 320-a may have a vertical reception polarization mode 310-a, and the UE beam 320-b may have a horizontal reception polarization mode 310-b.

In some cases, beamformed transmissions may be distorted or attenuated at the UE 115-c for one or more directions, which may result in a loss of orthogonality between polarization modes of the base station beams 325-a and 325-b. In some examples, a housing material 255-a (e.g., glass, aluminum) at the UE 115-c may have one or more frequency-dependent or angle-dependent properties that may interfere with an array response at the antenna array 350-b at the UE 115-c. For example, after passing through the housing material 255-a at the UE 115-c, electromagnetic radiation corresponding to the base station beams 325-a and 325-b may be directed toward different directions, as the housing material 255-a may have angle-dependent reflectivity properties, or attenuation properties, or both. That is, the polarization modes of the distorted base station beams 325-a and 325-b after passing through the housing material 255-a at the UE 115-c may not be orthogonal within a coverage area of the antenna array 350-b at the UE 115-c.

The loss in orthogonality may lead to cross-talk or interference between the distorted base station beams 325-a and 325-b.

In accordance with one or more aspects of the present disclosure, the wireless communications system 300 may support feedback reporting for polarization MIMO communications. For example, the UE 115-c may be configured to report feedback in a report 235-a to the base station 105-c to address polarization impairments for the base station beams 325-a and 325-b. The report 235-a may be an example of a report 235 described with reference to FIG. 2, and may indicate one or more polarization parameters associated with beam pairs identified in the beam sweep procedure, including the base station beams 325 and the UE beams 320 illustrated in FIG. 3.

Based on the report 235-a, the base station 105-c may transmit a beam configuration 241-a to the UE 115-c. In some examples, the beam configuration 241-a may identify a beam pair (e.g., the base station beams 325-a and 325-b) and one or more beam configuration parameters for reliable polarization MIMO communications with the UE 115-c. Based on the beam configuration 241-a, the UE 115-c may train or steer the UE beams 320-a and 320-b to receive one or more messages 345 from the base station 105-c. The UE beams 320 may be selected to reduce mixing or leakage of energy across the reception polarization modes 310 and improve interference between the UE beams 320. In some examples, based on the beam configuration 241-a, the UE beams 320 may use a receive configuration such that the UE beams 320 have reception polarization modes 310 that match the polarization modes 305 of the corresponding base station beams 325. For example, as illustrated in FIG. 3, the UE beam 320-a may have a vertical reception polarization mode 310-a, and the UE beam 320-b may have a horizontal reception polarization mode 310-b.

The base station 105-c may transmit a message 345-a using the base station beam 325-a and a message 345-b using the base station beam 325-b. By implementing one or more of the described techniques for reporting feedback, devices of the wireless communications system 300 may be able to implement polarized beamforming schemes responsive to signal propagation conditions and the report 235-a, or in a manner that increases communications efficiency, or considers power consumption or processing load, among other considerations.

Figure 4:
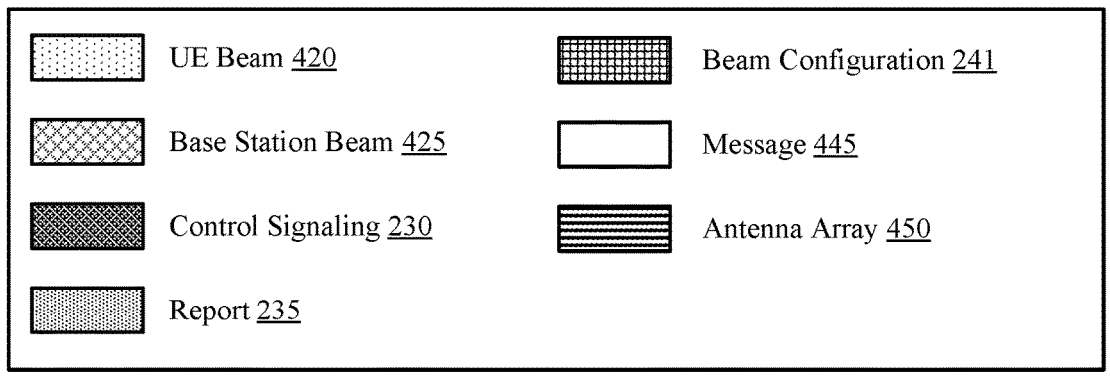
Figure 4:
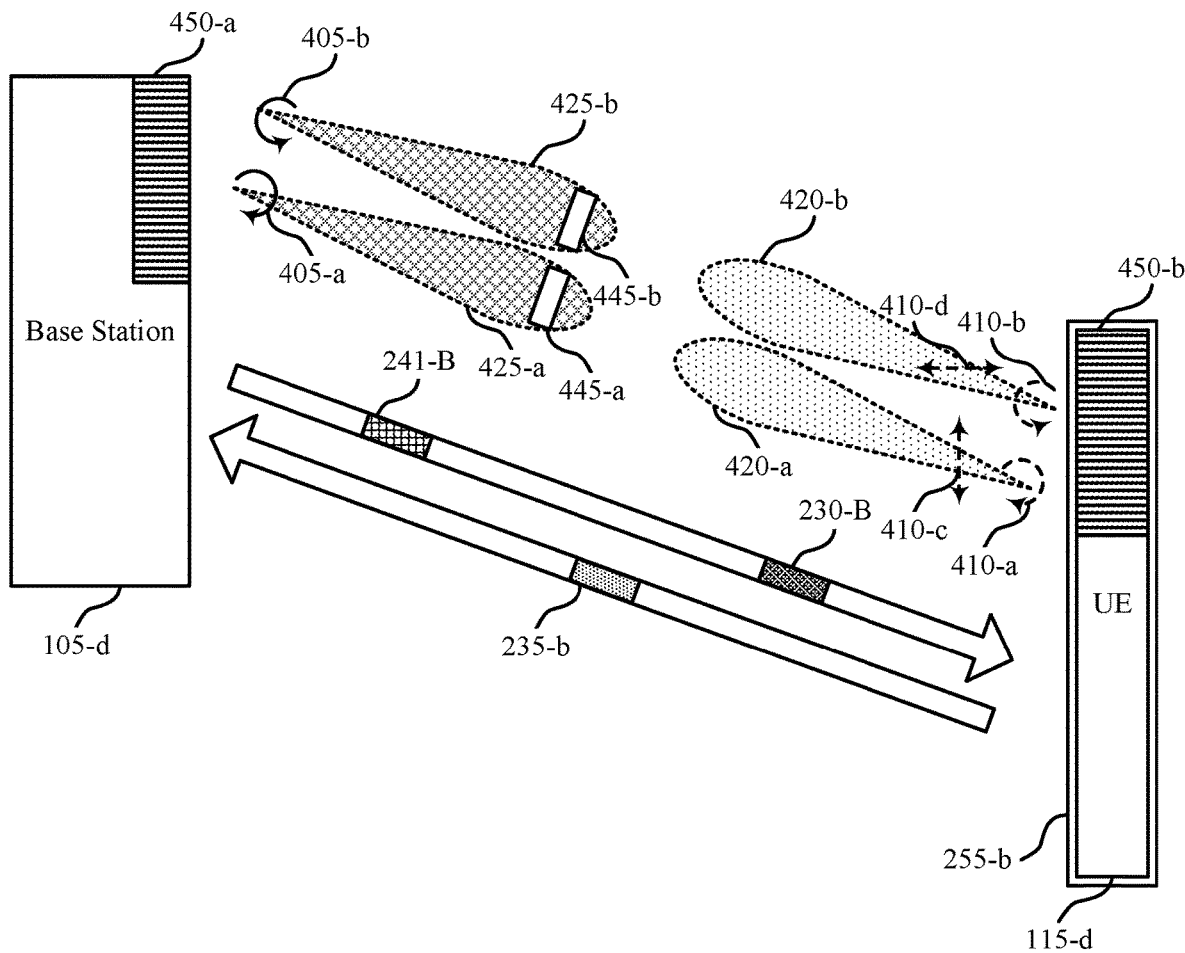

FIG. 4 illustrates an example of a wireless communications system 400 that supports techniques for feedback metrics associated with dual-polarized beamforming transmissions in accordance with one or more aspects of the present disclosure. In some examples, the wireless communications system 400 may implement aspects of the wireless communications system 100. For example, the wireless communications system 400 may include a base station 105-d and a UE 115-d, which may be examples of the corresponding devices described with reference to FIG. 1. The wireless communications system 400 may include features for improved communications between the UE 115-d and the base station 105-d, among other benefits.

The base station 105-d may transmit control signaling 230-b to the UE 115-d to initialize a beam sweep procedure, where the base station 105-d and the UE 115-d may identify one or more base station beams 425 and one or more UE beams 420 for beamformed communications based on the beam sweep procedure. In some examples, based on the beam sweep procedure, the base station 105-d may steer two base station beams 425-a and 425-b in a same direction to the UE 115-d using polarization MIMO communications, where the base station beam 425-a may have a first polarization mode 405-a that is orthogonal (e.g., perpendicular) to a second polarization mode 405-b of the base station beam 425-b. The UE 115-d may train UE beams 420 to communicate in directions corresponding to a coverage region, which may increase antenna gains for transmissions sent or received by the UE beams 420 in the coverage region. Polarization MIMO communications may reduce a signaling overhead associated with beamforming techniques, as beam management may be based on a single direction rather than multiple directions in spatial MIMO communications (e.g., using spatial multiplexing).

The base station 105-d may transmit signals using base station beams 425 with nominally orthogonal polarization modes 405. For example, the base station beams 425-a and 425-b may be circularly polarized in perpendicular orientations, where the base station beam 425-a may have a left-handed (e.g., clockwise) circular polarization mode 405-a and the base station beam 425-b may have a right-handed (e.g., counter-clockwise) circular polarization mode 405-b. The base station 105-d may use an antenna array 450-a (which may be an example of an antenna array 250-a described with reference to FIG. 2) to transmit the signals such that beam pattern responses or array gains of the base station beams 425-a and 425-b and the corresponding UE beams 420-a and 420-b may be symmetrical (or nearly symmetrical) over a coverage area or a coverage region of an antenna array 450-b at the UE 115-d. Further, the polarization modes 405 of the base station beams 425-a and 425-b may also be orthogonal (or nearly orthogonal, where linear polarization modes 405 may differ by an angle that is approximately 90°, such as 89° or 91°) across angles of the coverage area, for example as the base station beams 425-a and 425-b propagate through freespace (e.g., over the air).

In some cases, beamformed transmissions may be distorted or attenuated at the UE 115-d for one or more directions, which may result in a loss of orthogonality between polarization modes of the base station beams 425-a and 425-b. In some examples, a housing material 255-b (e.g., glass, aluminum) at the UE 115-d may have one or more frequency-dependent or angle-dependent properties that may interfere with an array response at the antenna array 450-b at the UE 115-d. For example, after passing through the housing material 255-b at the UE 115-d, electromagnetic radiation corresponding to the base station beams 425-a and 425-b may be directed toward different directions, as the housing material 255-b may have angle-dependent reflectivity properties, or attenuation properties, or both. That is, the polarization modes of the distorted base station beams 425-a and 425-b after passing through the housing material 255-b at the UE 115-d may not be orthogonal within a coverage area of the antenna array 450-b at the UE 115-d. The loss in orthogonality may lead to cross-talk or interference between the distorted base station beams 425-a and 425-b.

In accordance with one or more aspects of the present disclosure, the wireless communications system 400 may support feedback reporting for polarization MIMO communications. For example, the UE 115-d may be configured to report feedback in a report 235-b to the base station 105-d to address polarization impairments for the base station beams 425-a and 425-b. The report 235-b may be an example of a report 235 described with reference to FIG. 2, and may indicate one or more polarization parameters associated with beam pairs identified in the beam sweep procedure, including the base station beams 425 and the UE beams 420 illustrated in FIG. 4.

Based on the report 235-b, the base station 105-d may transmit a beam configuration 241-b to the UE 115-d. In some examples, the beam configuration 241-b may identify a beam pair (e.g., the base station beams 425-a and 425-b) and one or more beam configuration parameters for reliable polarization MIMO communications with the UE 115-d. Based on the beam configuration 241-b, the UE 115-d may train or steer the UE beams 420-a and 420-b to receive one or more messages 445 from the base station 105-d. The UE beams 420 may be selected to reduce mixing or leakage of energy across the reception polarization modes 410 and improve interference between the UE beams 420. In some examples, based on the beam configuration 241-b, the UE beams 420 may use a receive configuration such that the UE beams 420 have reception polarization modes 410 that match the polarization modes 405 of the corresponding base station beams 425. For example, the UE beam 420-a may have a left-handed (e.g., clockwise) circular reception polarization mode 410-a, and the UE beam 420-b may have a right-handed (e.g., counter-clockwise) circular reception polarization mode 410-b. In some examples, based on the beam configuration 241-b, the UE beams 420 may use a receive configuration such that the UE beams 420 have reception polarization modes 410 that are adjusted based on the distorted or attenuated beamformed transmissions. For example, the UE beam 420-a may have a vertical reception polarization mode 410-c, and the UE beam 420-b may have a horizontal reception polarization mode 410-d.

The base station 105-d may transmit a message 445-a using the base station beam 425-a and a message 445-b using the base station beam 425-b. By implementing one or more of the described techniques for reporting feedback, devices of the wireless communications system 300 may be able to implement polarized beamforming schemes responsive to signal propagation conditions and the report 235-b, or in a manner that increases communications efficiency, or considers power consumption or processing load, among other considerations.

Figure 5:
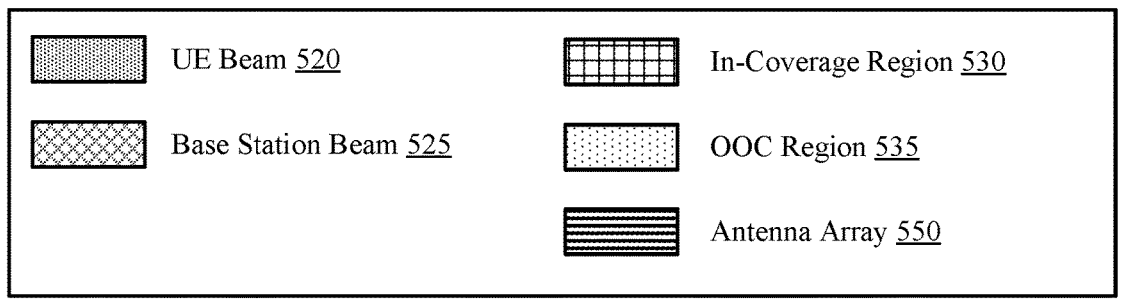
Figure 5:
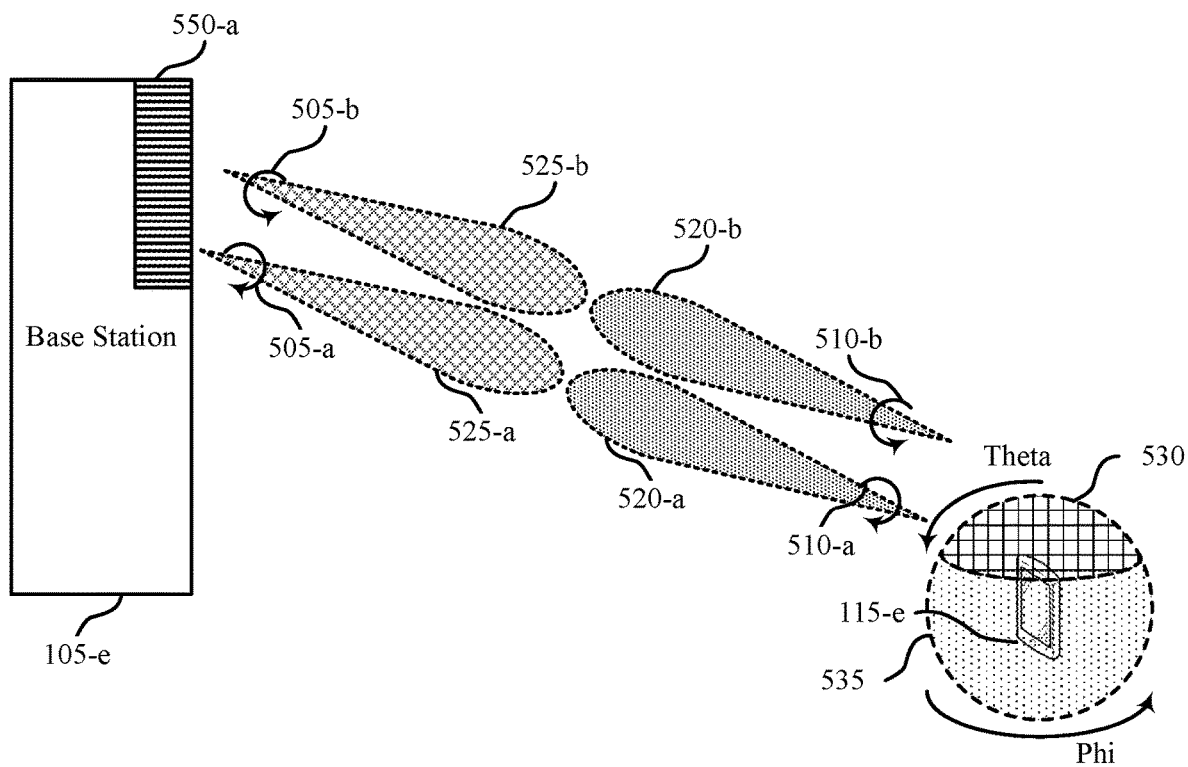

FIG. 5 illustrates an example of a wireless communications system 300 that supports techniques for feedback metrics associated with dual-polarized beamforming transmissions in accordance with one or more aspects of the present disclosure. In some examples, the wireless communications system 500 may implement aspects of the wireless communications system 100. For example, the wireless communications system 500 may include a base station 105-e and a UE 115-e, which may be examples of the corresponding devices described with reference to FIG. 1. The wireless communications system 300 may include features for improved communications between the UE 115-e and the base station 105-e, among other benefits.

In some examples, based on a beam sweep procedure, the base station 105-e may steer two base station beams 525-a and 525-b in a same direction to the UE 115-e using polarization MIMO communications, where the base station beam 525-a may have a first polarization mode 505-a that is orthogonal (e.g., perpendicular) to a second polarization mode 505-b of the base station beam 525-b. The UE 115-e may train UE beams 520 to communicate in directions corresponding to a coverage region, which may increase antenna gains for transmissions sent or received by the UE beams 520 in the coverage region. Polarization MIMO communications may reduce a signaling overhead associated with beamforming techniques, as beam management may be based on a single direction rather than multiple directions in spatial MIMO communications (e.g., using spatial multiplexing).

The base station 105-e may transmit signals using base station beams 525 with nominally orthogonal polarization modes 505. For example, the base station beams 525-a and 525-b may be circularly polarized in perpendicular orientations, where the base station beam 525-a may have a left-handed (e.g., clockwise) circular polarization mode 505-a and the base station beam 525-b may have a right-handed (e.g., counter-clockwise) circular polarization mode 505-b. The base station 105-e may use an antenna array 550-a (which may be an example of an antenna array 250-a described with reference to FIG. 2) to transmit the signals such that beam pattern responses or array gains of the base station beams 525-a and 525-b and the corresponding UE beams 520-a and 520-b may be symmetrical (or nearly symmetrical) over directions of an in-coverage region 530 at the UE 115-e.

The in-coverage region 530 may include a direction with a peak antenna gain at the UE 115-e and a coverage area with antenna gains near the peak gain. An out-of-coverage (OOC) region 535 may include directions with reduced antenna gain at the UE 115-e, for example based on destructive interference of energy generated at the antenna module 550-a. The directions included in the in-coverage region 530 and the OOC region 535 may be expressed in terms of an azimuthal angle about the UE 115-e, which may be referred to as phi or Φ, and polar angle or inclination from a zenith of the UE 115-e, which may be referred to as theta or Θ The polarization modes 505 of the base station beams 525-a and 525-b may be orthogonal (or nearly orthogonal) across angles of the in-coverage region 530, for example as the base station beams 525-a and 525-b propagate through freespace (e.g., over the air). In some examples, the in-coverage region 530 and the OOC region 535 may correspond to an antenna array at the UE 115-e (e.g., an antenna array 250-b described with reference to FIG. 2).

In accordance with one or more aspects of the present disclosure, the wireless communications system 500 may support feedback reporting for polarization MIMO communications. For example, the UE 115-e may be configured to report feedback in a report 235-b to the base station 105-e to address polarization impairments for the base station beams 525-a and 525-b. The report 235-b may be an example of a report 235 described with reference to FIG. 2, and may indicate one or more polarization parameters associated with beam pairs identified in the beam sweep procedure, including the base station beams 525 and the UE beams 520 illustrated in FIG. 4.

Based on the report 235-b, the base station 105-e may transmit a beam configuration 241-b to the UE 115-e. In some examples, the beam configuration 241-b may identify a beam pair (e.g., the base station beams 525-a and 525-b) and one or more beam configuration parameters for reliable polarization MIMO communications with the UE 115-e. Based on the beam configuration 241-b, the UE 115-e may train or steer the UE beams 520-a and 520-b to receive one or more messages 445 from the base station 105-e. The UE beams 520 may be selected to reduce mixing or leakage of energy across the reception polarization modes 510 and improve interference between the UE beams 520. In some examples, based on the beam configuration 241-b, the UE beams 520 may use a receive configuration such that the UE beams 520 have reception polarization modes 510 that match the polarization modes 505 of the corresponding base station beams 525. For example, the UE beam 520-a may have a left-handed (e.g., clockwise) circular reception polarization mode 510-*a*, and the UE beam 520-*b* may have a right-handed (e.g., counter-clockwise) circular reception polarization mode 510-*b*.

Figure 6A:
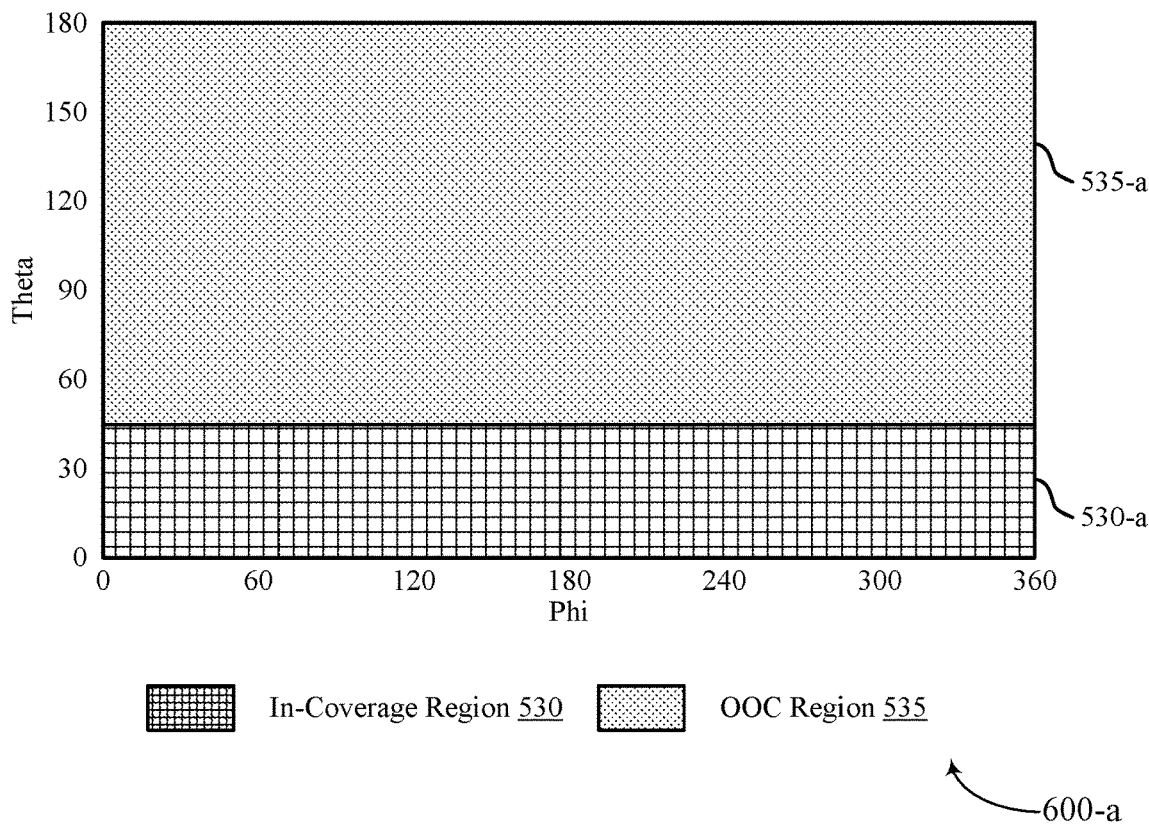
FIGS. 6A & 6B illustrate examples of field diagrams that support techniques for feedback metrics associated with dual-polarized beamforming transmissions in accordance with one or more aspects of the present disclosure.
Figure 6B:
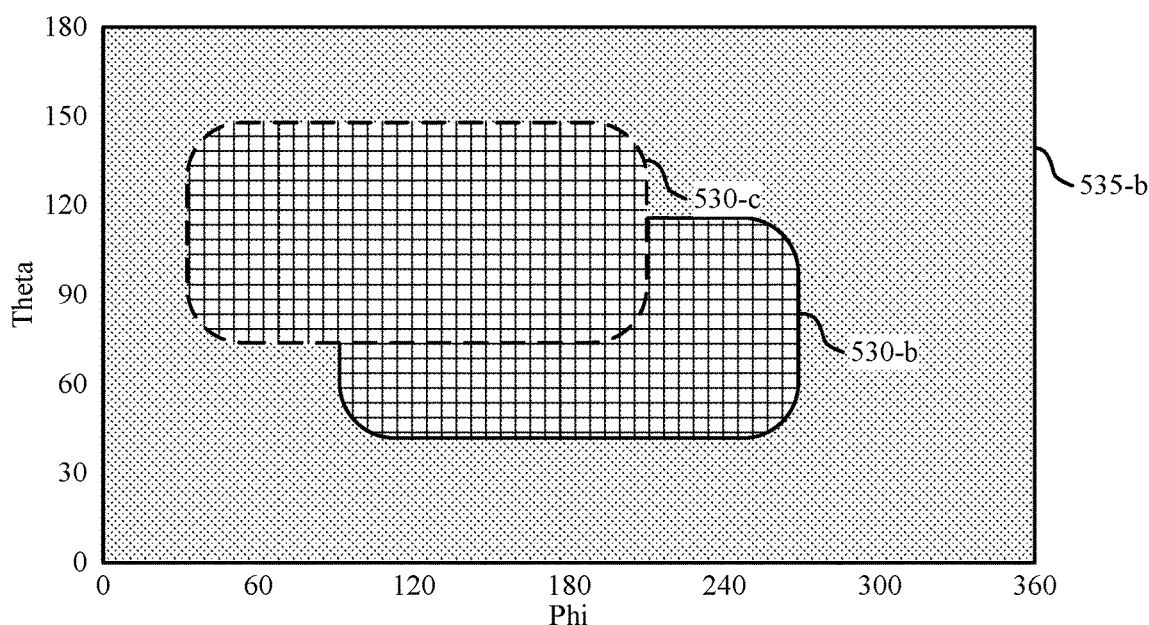

FIGS. 6A and 6B illustrate examples of field diagrams 600 that support techniques for feedback metrics associated with dual-polarized beamforming transmissions in accordance with one or more aspects of the present disclosure. In some examples, the field diagrams 500 may implement or be implemented by one or more aspects of the wireless communications systems 100, 200, 300, 400, and 500. For example, each field diagram 600 may illustrate an electric field that includes energy generated by an antenna array (e.g., an antenna element or a set of antennas) at a base station for communications with a UE, which may be examples of the corresponding devices described with reference to FIGS. 1 through 5. The field diagrams 600 may illustrate features for reliable communications between the UE and the base station, among other benefits.

Each field diagram 600 may illustrate the electric field in a spherical coordinate system corresponding to orientations or directions with respect to the UE. A horizontal axis of the field diagram 600 may correspond to an azimuthal angle about the UE, which may be referred to as phi or Φ. A vertical axis of the field diagram 600 may correspond to a polar angle or inclination from a zenith of the UE, which may be referred to as theta or Θ. The field diagram 600 may include an in-coverage region 530 and an out-of-coverage (OOC) region 535 for the UE, for example as described with reference to FIG. 5. In some examples, an in-coverage region 530 and an OOC region 535 may correspond to an antenna array at the UE (e.g., an antenna array 250-*b* described with reference to FIG. 2). The base station may generate energy using the set of antennas, which may be combined such that signals propagating in one or more directions may experience an antenna gain based on constructive interference of the generated energy. The in-coverage region 530 may include the direction with a peak antenna gain and a coverage area with antenna gains near the peak gain. The OOC region 535 may include directions with reduced antenna gain, for example based on destructive interference of the generated energy.

In some cases, the electric field in the OOC region 535 (i.e., the area outside the in-coverage region 530) may be unstructured, and the electric field may vary from one antenna element to another at the UE. The base station may generate energy using beams designed to increase throughput in the in-coverage region 530, which may result in decreased antenna gains in the OOC region 535. In some examples, a beam from the base station may arrive at an angle outside the in-coverage region 530, such as due to motion of the UE, which may lead to reduced performance of beamformed communications.

As illustrated in FIG. 6A, a field diagram 600-*a* may represent an electric field of a base station beam (e.g., a base station beam 525 described with reference to FIG. 5) as the beam propagates through freespace. In some examples, the base station may transmit signals using a pair of base station beams with nominally orthogonal polarization modes (e.g., base station beams 525 with corresponding polarization modes 505 as described with reference to FIG. 5). The base station may transmit the signals such that the field diagrams 600 associated with each beam are symmetrical (e.g., each beam has an electric field represented by the field diagram 600-*a*) such that the base station may use polarization MIMO techniques to communicate with the UE using two layers corresponding to the pair of beams in directions included in the in-coverage region 530-*a*. In some examples, the base station may initialize a beam sweep procedure to identify and select a pair of polarized beams with a direction included in the in-coverage region 530-*a*.

FIG. 6B illustrates a field diagram 600-*b* associated with beamformed transmissions that may be distorted or attenuated at the UE for one or more directions, which may result in a loss of orthogonality between polarization modes of the base station beams. For example, the field diagram 600-*b* may represent an electric field distorted after passing through a housing material at the UE. The field diagram 600-*b* may include an in-coverage region 530-*b* associated with a first polarization mode (e.g., a horizontal linear polarization mode) that includes angles or directions different from the angles or directions included in the in-coverage region 530-*a* illustrated in FIG. 6A. In some examples, an in-coverage region 530-*c* associated with a second polarization mode (e.g., a vertical linear polarization mode) may partially overlap with the in-coverage region 530-*b*. However, the overlap of the coverage regions 530-*b* and 530-*c* may not be included in the in-coverage region 530-*a*, and so the UE may report a loss in orthogonality for the polarized beam pair that is selected based on the beam sweep procedure.

In accordance with one or more aspects of the present disclosure, the UE may be configured to report feedback to the base station to address polarization impairments in MIMO communications. For example, the UE may transmit a report to the base station indicating one or more polarization parameters associated with beam pairs identified in the beam sweep procedure. In some examples, the UE may report the overlap of the coverage regions 530-*b* and 530-*c* where orthogonality may be maintained between polarized beam pairs at the antenna array of the UE. Additionally or alternatively, the UE may report when the selected pair of polarized beams loses orthogonality. The UE may report a metric of the orthogonality (e.g., an ECC, such as an ECC 240 described with reference to FIG. 2) to indicate how much of the orthogonality was lost. In some examples, the UE may also indicate an alternate viable beam pair (e.g., within the overlap of the coverage regions 530-*b* and 530-*c*) to the base station. By implementing one or more of the described techniques for reporting feedback, the UE and the base station may be able to implement polarized beamforming schemes responsive to signal propagation conditions and related feedback reports.

Figure 7:
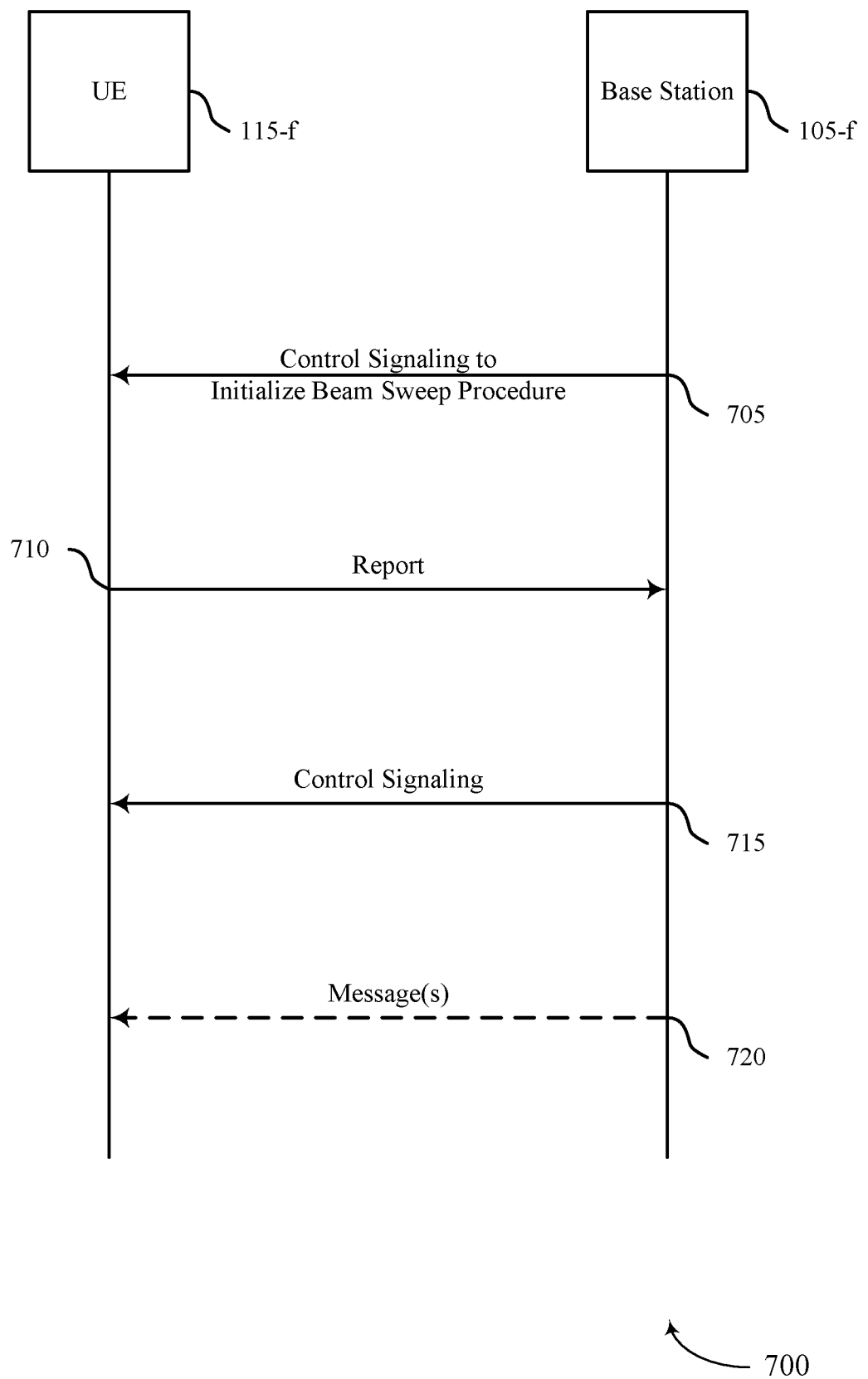
FIG. 7 illustrates an example of a process flow that supports techniques for feedback metrics associated with dual-polarized beamforming transmissions in accordance with one or more aspects of the present disclosure.

FIG. 7 illustrates an example of a process flow 700 that supports techniques for feedback metrics associated with dual-polarized beamforming transmissions in accordance with one or more aspects of the present disclosure. In some examples, the process flow 700 may implement one or more aspects of wireless communications systems 100, 200, 300, 400, and 500. For example, the process flow 700 may include example operations associated with one or more of a base station 105-*f* or a UE 115-*f*, which may be examples of corresponding devices described with reference to FIGS. 1 through 4. In the following description of the process flow 700, the operations between the base station 105-*f* and the UE 115-*f* may be performed in a different order than the example order shown, or the operations performed by the base station 105-*f* and the UE 115-*f* may be performed in different orders or at different times. Some operations may also be omitted from the process flow 700, and other operations may be added to the process flow 700. The operations performed by the base station 105-*f* and the UE 115-*f* may support improvements to polarized beamforming and, in some examples, may increase communications efficiency, among other benefits.

At 705, the base station **105-*f* may transmit control signaling to the UE 115-*f* to initialize a beam sweep procedure. Based on the beam sweep procedure, the base station 105-*f* and the UE 115-*f* may identify one or more beam pairs for establishing a communications link. The base station 105-*f* and the UE 115-*f* may select a pair of polarized beams in a same direction for communications via two layers using polarization MIMO techniques. For example, the beams of the beam pair may have respective polarization modes that are orthogonal to one another. In some examples, the base station 105-*f* may communicate with the UE 115-*f*** via additional spatial layers (e.g., 4 layers, 6 layers, or more layers) by combining polarization MIMO techniques and spatial MIMO techniques (e.g., spatial multiplexing).

At 710, the UE **115-*f* may transmit a report to the base station 105-*f*. The report may indicate one or more polarization parameters associated with beam pairs identified in the beam sweep procedure. In some examples, the UE 115-*f* may report an angular coverage region (e.g., a set of directions from which the UE 115-*f* may receive beamformed transmissions) where orthogonality may be maintained between polarized beam pairs. Additionally or alternatively, the UE 115-*f* may report when the selected pair of polarized beams loses orthogonality. The UE 115-*f* may report a metric of the orthogonality (e.g., an ECC) to indicate how much of the orthogonality was lost. In some examples, the UE 115-*f* may also indicate an alternate viable beam pair to the base station 105-*f*** in the report.

At 715, the base station **105-*f* may transmit second control signaling to the UE 115-*f*** based on the report. The second control signaling may indicate a beam configuration, such as an alternate beam pair for polarization MIMO communications based on the angular coverage region or beam pairs identified in the report.

In some examples, at 720 the base station **105-*f* may transmit one or more messages to the UE 115-*f* according to the beam configuration. By implementing one or more of the described techniques for reporting feedback, the UE 115-*f* and the base station 105-*f*** may be able to implement polarized beamforming schemes responsive to signal propagation conditions and related feedback reports, or in a manner that increases communications efficiency, or considers power consumption or processing load, among other considerations.

Figure 8:
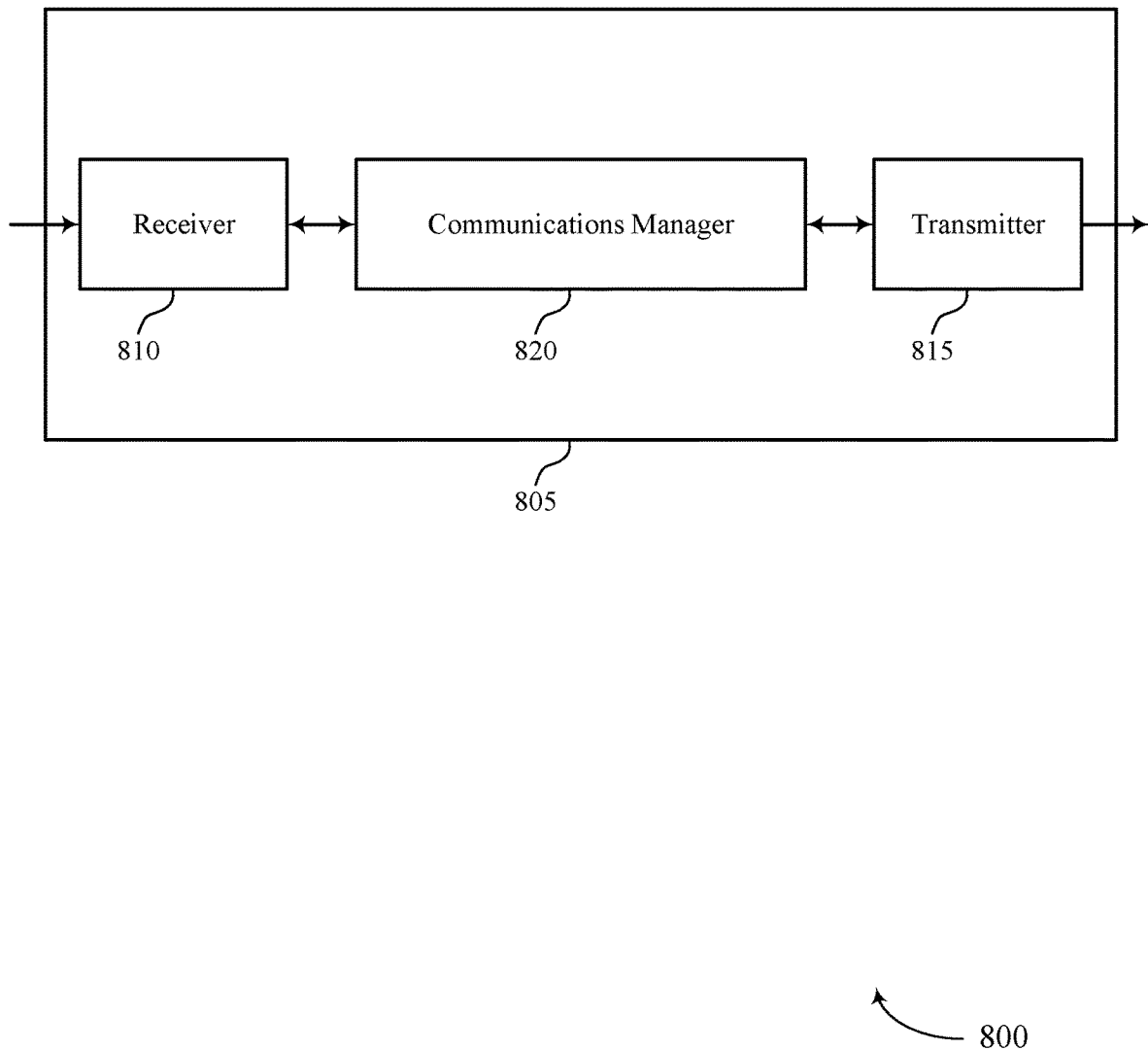
FIGS. 8 and 9 show block diagrams of devices that support techniques for feedback metrics associated with dual-polarized beamforming transmissions in accordance with one or more aspects of the present disclosure.

FIG. 8 shows a block diagram 800 of a device 805 that supports techniques for feedback metrics associated with dual-polarized beamforming transmissions in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for feedback metrics associated with dual-polarized beamforming transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for feedback metrics associated with dual-polarized beamforming transmissions). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for feedback metrics associated with dual-polarized beamforming transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, first control signaling to initialize a beam sweep procedure. The communications manager 820 may be configured as or otherwise support a means for transmitting, to the base station, a report including one or more polarization parameters relating to a coverage region for communications between the base station and the UE, the one or more polarization parameters associated with the beam sweep procedure. The communications manager 820 may be configured as or otherwise support a means for receiving, from base station, second control signaling indicating a beam configuration for the communications between the base station and the UE, the beam configuration based on the report.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reducing power consumption and increasing transmission reliability. In some aspects, the processor of the device 505 may generate feedback associated with beamformed transmissions in polarization MIMO communications. For example, the processor of the device 505 may turn on one or more processing units for processing beamformed transmissions, increase a processing clock, or a similar mechanism within the device 505. As such, when subsequent beamformed communication links are established using polarization MIMO techniques, the processor may more accurately generate feedback associated with polarized beam pairs. Improvements in feedback transmission may result in improvements in power saving and communications reliability, which may further increase power efficiency at the device 805 (e.g., by eliminating unnecessary repeated beam sweep procedures).

Figure 9:
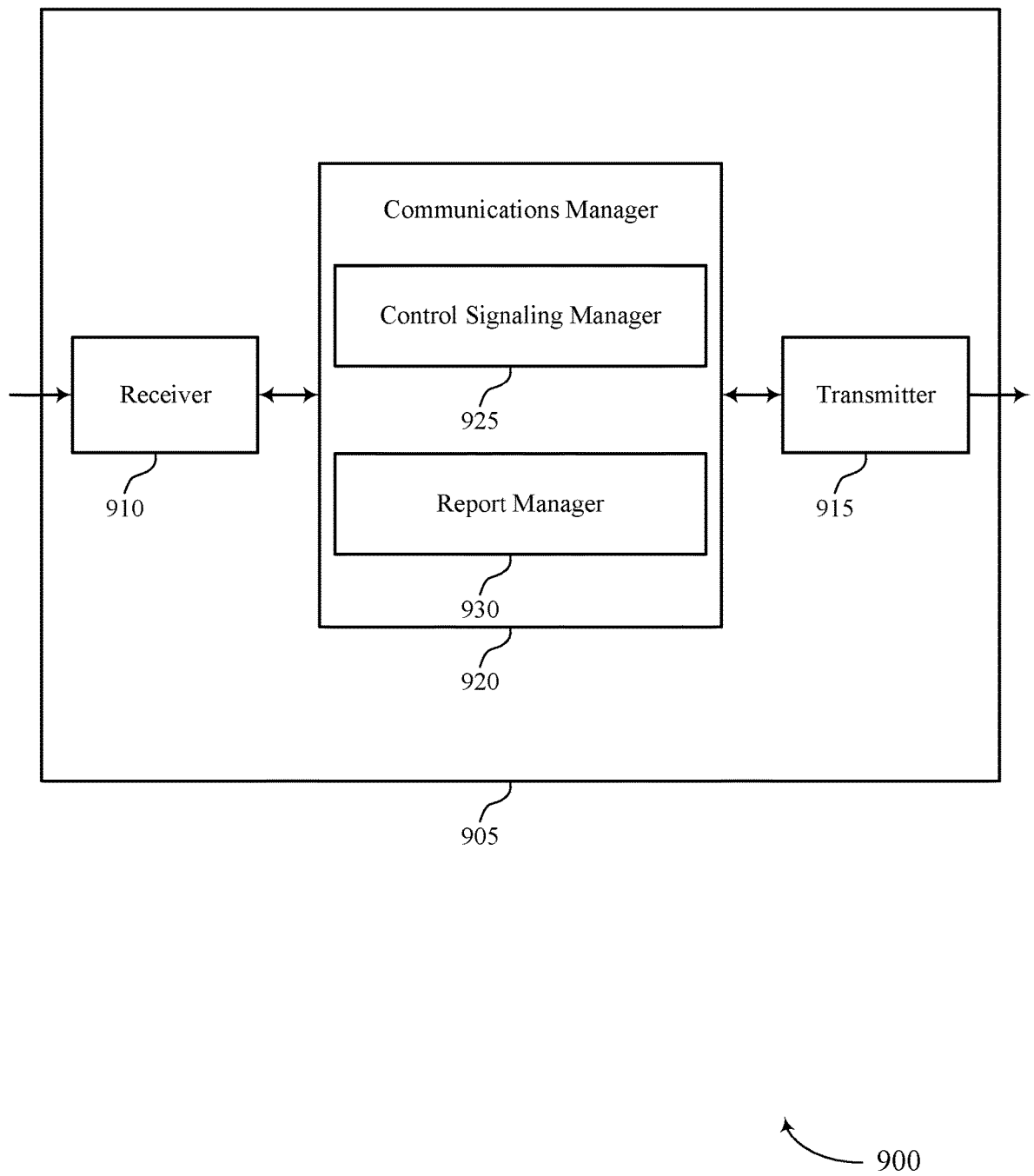

FIG. 9 shows a block diagram 900 of a device 905 that supports techniques for feedback metrics associated with dual-polarized beamforming transmissions in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for feedback metrics associated with dual-polarized beamforming transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for feedback metrics associated with dual-polarized beamforming transmissions). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for feedback metrics associated with dual-polarized beamforming transmissions as described herein. For example, the communications manager 920 may include a control signaling manager 925 a report manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The control signaling manager 925 may be configured as or otherwise support a means for receiving, from a base station, first control signaling to initialize a beam sweep procedure. The report manager 930 may be configured as or otherwise support a means for transmitting, to the base station, a report including one or more polarization parameters relating to a coverage region for communications between the base station and the UE, the one or more polarization parameters associated with the beam sweep procedure. The control signaling manager 925 may be configured as or otherwise support a means for receiving, from base station, second control signaling indicating a beam configuration for the communications between the base station and the UE, the beam configuration based on the report.

Figure 10:
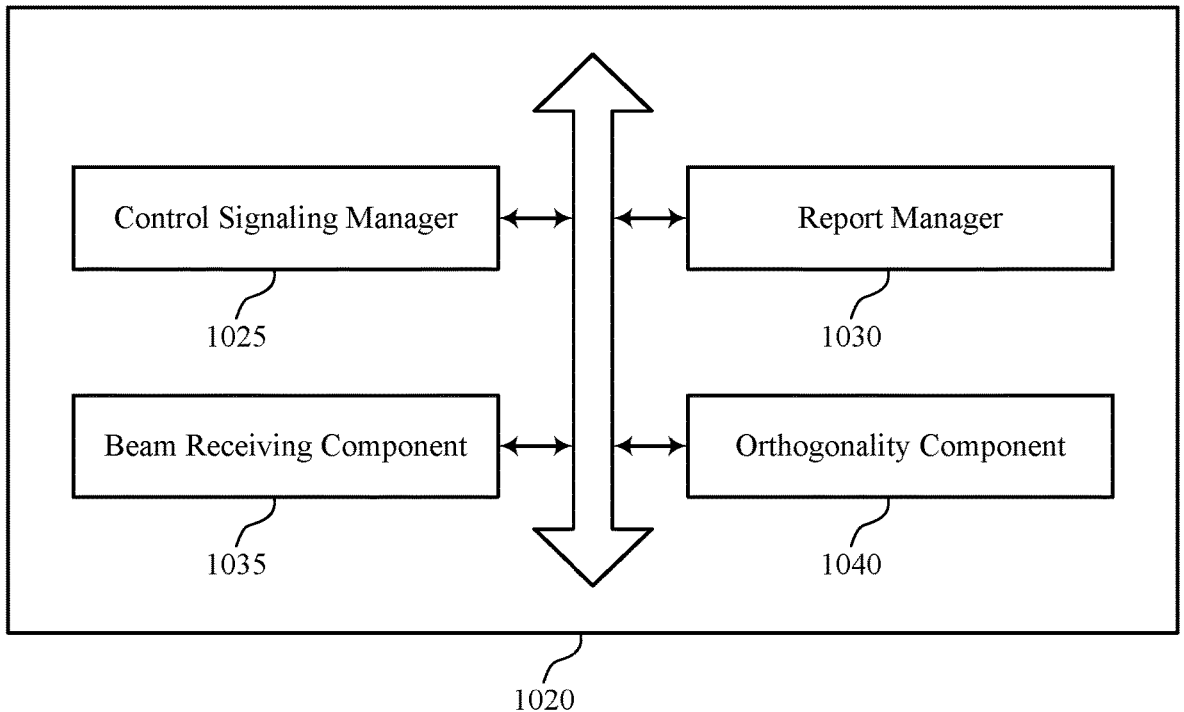
FIG. 10 shows a block diagram of a communications manager that supports techniques for feedback metrics associated with dual-polarized beamforming transmissions in accordance with one or more aspects of the present disclosure.

FIG. 10 shows a block diagram 1000 of a communications manager 1020 that supports techniques for feedback metrics associated with dual-polarized beamforming transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for feedback metrics associated with dual-polarized beamforming transmissions as described herein. For example, the communications manager 1020 may include a control signaling manager 1025, a report manager 1030, a beam receiving component 1035, an orthogonality component 1040, or any combination thereof. Each of these components may communicate, directly or indirectly, with one another (e.g., via one or more buses).

The communications manager 1020 may support wireless communications at a UE in accordance with examples as disclosed herein. The control signaling manager 1025 may be configured as or otherwise support a means for receiving, from a base station, first control signaling to initialize a beam sweep procedure. The report manager 1030 may be configured as or otherwise support a means for transmitting, to the base station, a report including one or more polarization parameters relating to a coverage region for communications between the base station and the UE, the one or more polarization parameters associated with the beam sweep procedure. In some examples, the control signaling manager 1025 may be configured as or otherwise support a means for receiving, from base station, second control signaling indicating a beam configuration for the communications between the base station and the UE, the beam configuration based on the report.

In some examples, the report manager 1030 may be configured as or otherwise support a means for transmitting, in the report, an indication of one or more angular spread parameters for the coverage region, the one or more polarization parameters including the one or more angular spread parameters.

In some examples, the report manager 1030 may be configured as or otherwise support a means for transmitting, in the report, an indication of one or more beam pairs based on the coverage region, the one or more polarization parameters relating to the one or more beam pairs.

In some examples, the one or more beam pairs include a beam pair that is indicated based on an orthogonality parameter associated with the beam pair, the one or more polarization parameters including the orthogonality parameter.

In some examples, the orthogonality parameter identifies a loss in orthogonality for the beam pair.

In some examples, the one or more beam pairs include a first beam pair that is selected based on the beam sweep procedure and a second beam pair that is identified based on the one or more polarization parameters, the one or more polarization parameters including a first orthogonality parameter associated with the first beam pair, a second orthogonality parameter associated with the second beam pair, or both.

In some examples, the beam receiving component 1035 may be configured as or otherwise support a means for receiving, in accordance with the beam configuration, a first message using a first beam with a first polarization. In some examples, the beam receiving component 1035 may be configured as or otherwise support a means for receiving, in accordance with the beam configuration, a second message using a second beam with a second polarization different from the first polarization.

In some examples, the orthogonality component 1040 may be configured as or otherwise support a means for determining an orthogonality parameter associated with a beam pair that is selected based on the beam sweep procedure, the one or more polarization parameters including the orthogonality parameter.

In some examples, the orthogonality component 1040 may be configured as or otherwise support a means for comparing the orthogonality parameter with a threshold, where the report is transmitted based on the comparing.

In some examples, the orthogonality parameter includes an envelope correlation coefficient corresponding to a correlation between a first component of a first electric field associated with a first beam of the beam pair and a second component of a second electric field associated with a second beam of the beam pair, the first electric field emitted at a first antenna array of the base station and the second electric field emitted at a second antenna array of the base station.

In some examples, the one or more polarization parameters are based on a frequency that is used for communications between the base station and the UE.

Figure 11:
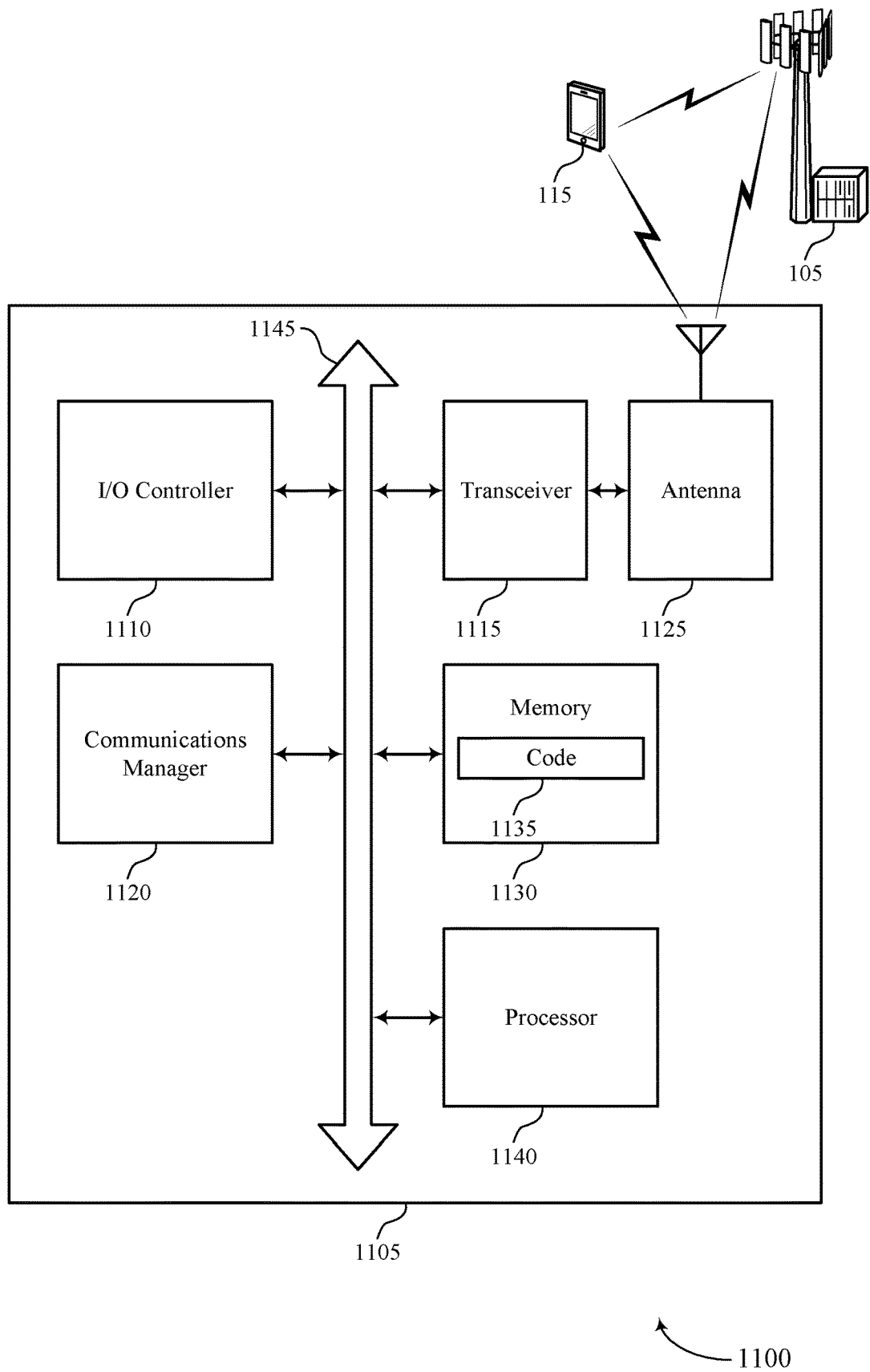
FIG. 11 shows a diagram of a system including a device that supports techniques for feedback metrics associated with dual-polarized beamforming transmissions in accordance with one or more aspects of the present disclosure.

FIG. 11 shows a diagram of a system 1100 including a device 1105 that supports techniques for feedback metrics associated with dual-polarized beamforming transmissions in accordance with one or more aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for feedback metrics associated with dual-polarized beamforming transmissions). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, first control signaling to initialize a beam sweep procedure. The communications manager 1120 may be configured as or otherwise support a means for transmitting, to the base station, a report including one or more polarization parameters relating to a coverage region for communications between the base station and the UE, the one or more polarization parameters associated with the beam sweep procedure. The communications manager 1120 may be configured as or otherwise support a means for receiving, from base station, second control signaling indicating a beam configuration for the communications between the base station and the UE, the beam configuration based on the report.

By including or configuring the communications manager 1120 in accordance with examples as described herein, the device 1105 may support techniques for saving power by communicating with base stations 105 (as shown in FIG. 1) in communications more efficiently. For example, the device 1105 may improve reliability in communications with base stations 105, as the device 1105 may be able to reliably generate feedback corresponding to beamformed transmissions in polarization MIMO communications. Using the techniques described herein, the device 1105 may more accurately communicate with base stations 105, which may improve power efficiency at the device 1105.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for feedback metrics associated with dual-polarized beamforming transmissions as described herein, or the processor 1140 and the memory 1130 may be otherwise configured to perform or support such operations.

Figure 12:
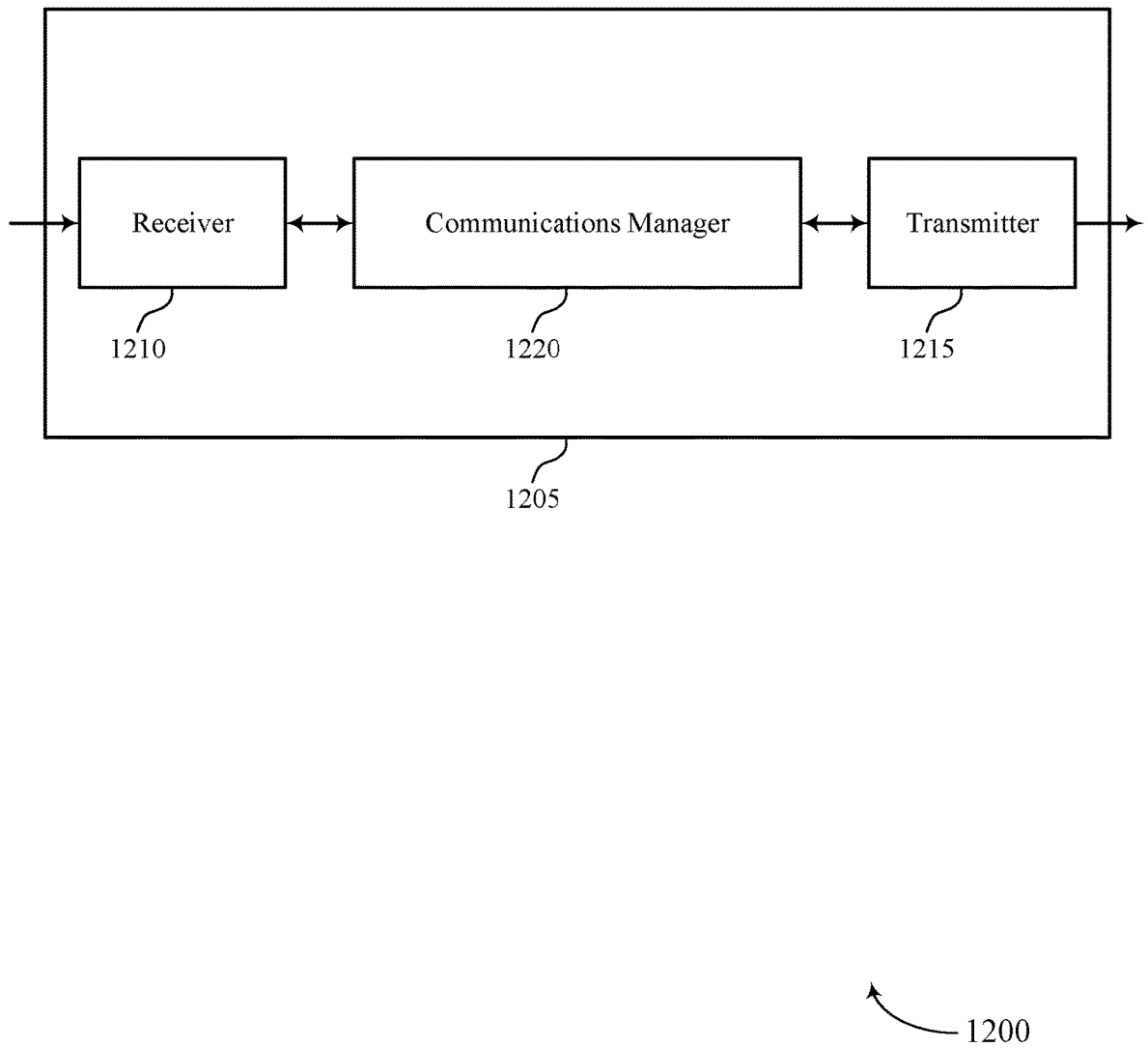
FIGS. 12 and 13 show block diagrams of devices that support techniques for feedback metrics associated with dual-polarized beamforming transmissions in accordance with one or more aspects of the present disclosure.

FIG. 12 shows a block diagram 1200 of a device 1205 that supports techniques for feedback metrics associated with dual-polarized beamforming transmissions in accordance with one or more aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for feedback metrics associated with dual-polarized beamforming transmissions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for feedback metrics associated with dual-polarized beamforming transmissions). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for feedback metrics associated with dual-polarized beamforming transmissions as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, first control signaling to initialize a beam sweep procedure. The communications manager 1220 may be configured as or otherwise support a means for receiving, from the UE, a report including one or more polarization parameters relating to a coverage region for communications between the base station and the UE, the one or more polarization parameters associated with the beam sweep procedure. The communications manager 1220 may be configured as or otherwise support a means for transmitting, to the UE, second control signaling indicating a beam configuration for the communications between the base station and the UE, the beam configuration based on the report.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing, reduced power consumption, more efficient utilization of communication resources, etc.

Figure 13:
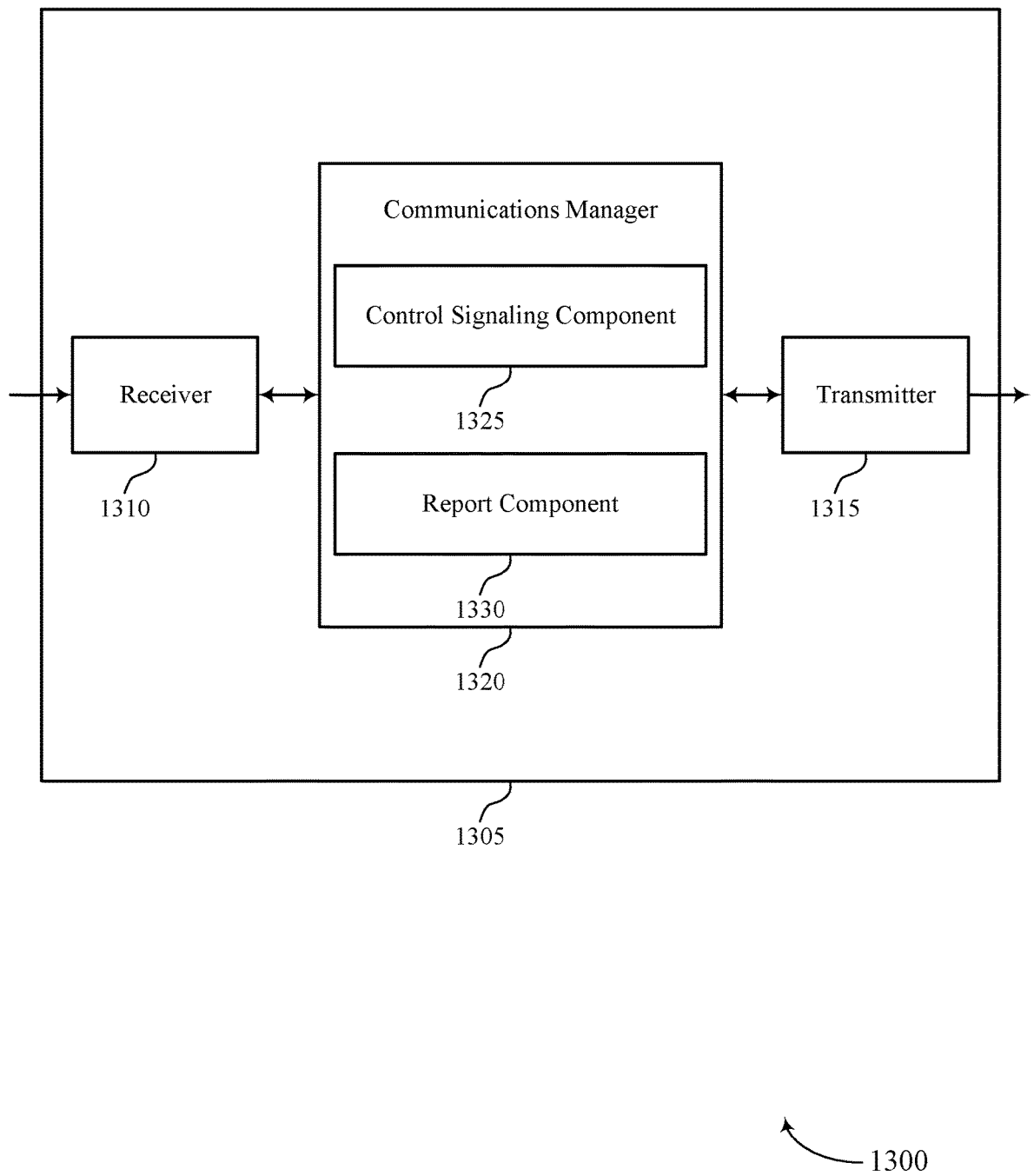

FIG. 13 shows a block diagram 1300 of a device 1305 that supports techniques for feedback metrics associated with dual-polarized beamforming transmissions in accordance with one or more aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for feedback metrics associated with dual-polarized beamforming transmissions). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for feedback metrics associated with dual-polarized beamforming transmissions). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for feedback metrics associated with dual-polarized beamforming transmissions as described herein. For example, the communications manager 1320 may include a control signaling component 1325 a report component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The control signaling component 1325 may be configured as or otherwise support a means for transmitting, to a UE, first control signaling to initialize a beam sweep procedure. The report component 1330 may be configured as or otherwise support a means for receiving, from the UE, a report including one or more polarization parameters relating to a coverage region for communications between the base station and the UE, the one or more polarization parameters associated with the beam sweep procedure. The control signaling component 1325 may be configured as or otherwise support a means for transmitting, to the UE, second control signaling indicating a beam configuration for the communications between the base station and the UE, the beam configuration based on the report.

Figure 14:
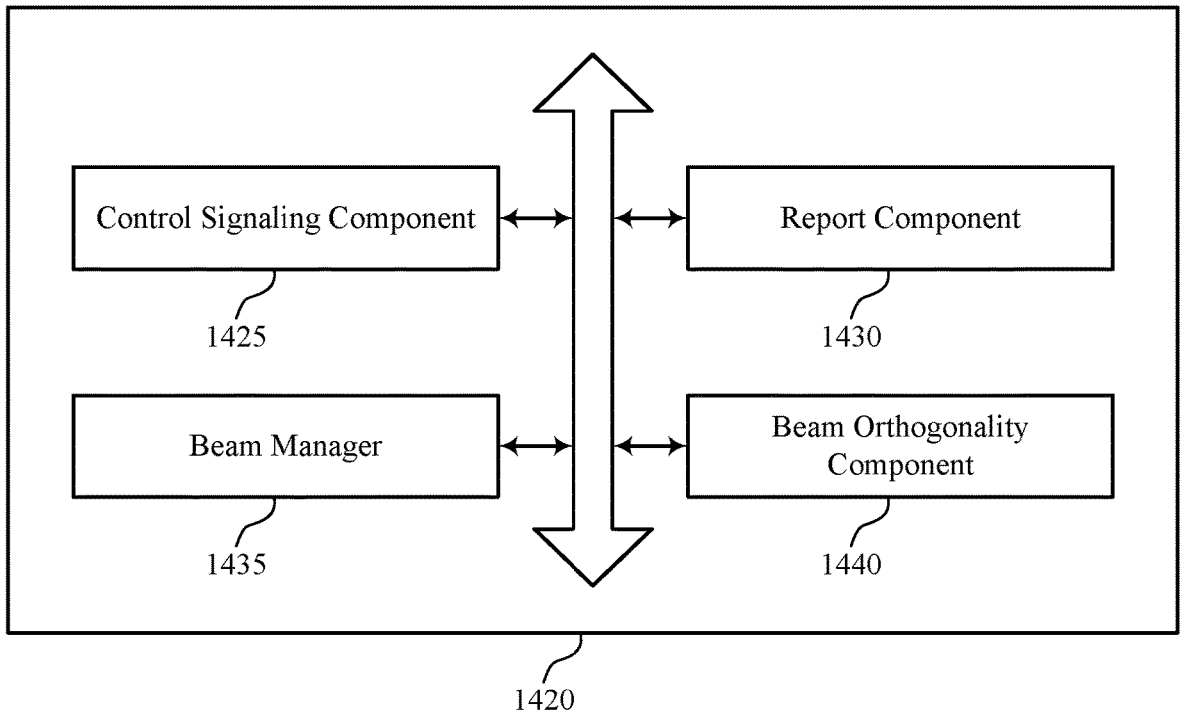
FIG. 14 shows a block diagram of a communications manager that supports techniques for feedback metrics associated with dual-polarized beamforming transmissions in accordance with one or more aspects of the present disclosure.

FIG. 14 shows a block diagram 1400 of a communications manager 1420 that supports techniques for feedback metrics associated with dual-polarized beamforming transmissions in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for feedback metrics associated with dual-polarized beamforming transmissions as described herein. For example, the communications manager 1420 may include a control signaling component 1425, a report component 1430, a beam manager 1435, a beam orthogonality component 1440, or any combination thereof. Each of these components may communicate, directly or indirectly, with one another (e.g., via one or more buses).

The communications manager 1420 may support wireless communications at a base station in accordance with examples as disclosed herein. The control signaling component 1425 may be configured as or otherwise support a means for transmitting, to a UE, first control signaling to initialize a beam sweep procedure. The report component 1430 may be configured as or otherwise support a means for receiving, from the UE, a report including one or more polarization parameters relating to a coverage region for communications between the base station and the UE, the one or more polarization parameters associated with the beam sweep procedure. The control signaling component 1425 may be configured as or otherwise support a means for transmitting, to the UE, second control signaling indicating a beam configuration for the communications between the base station and the UE, the beam configuration based on the report.

In some examples, the report component 1430 may be configured as or otherwise support a means for receiving, in the report, an indication of one or more angular spread parameters for the coverage region, the one or more polarization parameters including the one or more angular spread parameters.

In some examples, the report component 1430 may be configured as or otherwise support a means for receiving, in the report, an indication of one or more beam pairs based on the coverage region, the one or more polarization parameters relating to the one or more beam pairs.

In some examples, the one or more beam pairs include a beam pair that is indicated based on an orthogonality parameter associated with the beam pair, the one or more polarization parameters including the orthogonality parameter.

In some examples, the orthogonality parameter identifies a loss in orthogonality for the beam pair.

In some examples, the one or more beam pairs include a first beam pair that is selected based on the beam sweep procedure and a second beam pair that is identified based on the one or more polarization parameters, the one or more polarization parameters including a first orthogonality parameter associated with the first beam pair, a second orthogonality parameter associated with the second beam pair, or both.

In some examples, the beam manager 1435 may be configured as or otherwise support a means for transmitting, in accordance with the beam configuration, a first message using a first beam with a first polarization. In some examples, the beam manager 1435 may be configured as or otherwise support a means for transmitting, in accordance with the beam configuration, a second message using a second beam with a second polarization different from the first polarization.

In some examples, the beam orthogonality component 1440 may be configured as or otherwise support a means for determining an orthogonality parameter associated with a beam pair that is selected based on the receiving the report, the one or more polarization parameters including the orthogonality parameter.

In some examples, the report includes a result of a comparison between the orthogonality parameter and a threshold.

In some examples, the orthogonality parameter includes an envelope correlation coefficient corresponding to a correlation between a first component of a first electric field associated with a first beam of the beam pair and a second component of a second electric field associated with a second beam of the beam pair, the first electric field emitted at a first antenna array of the base station and the second electric field emitted at a second antenna array of the base station.

In some examples, the one or more polarization parameters are based on a frequency that is used for communications between the base station and the UE.

Figure 15:
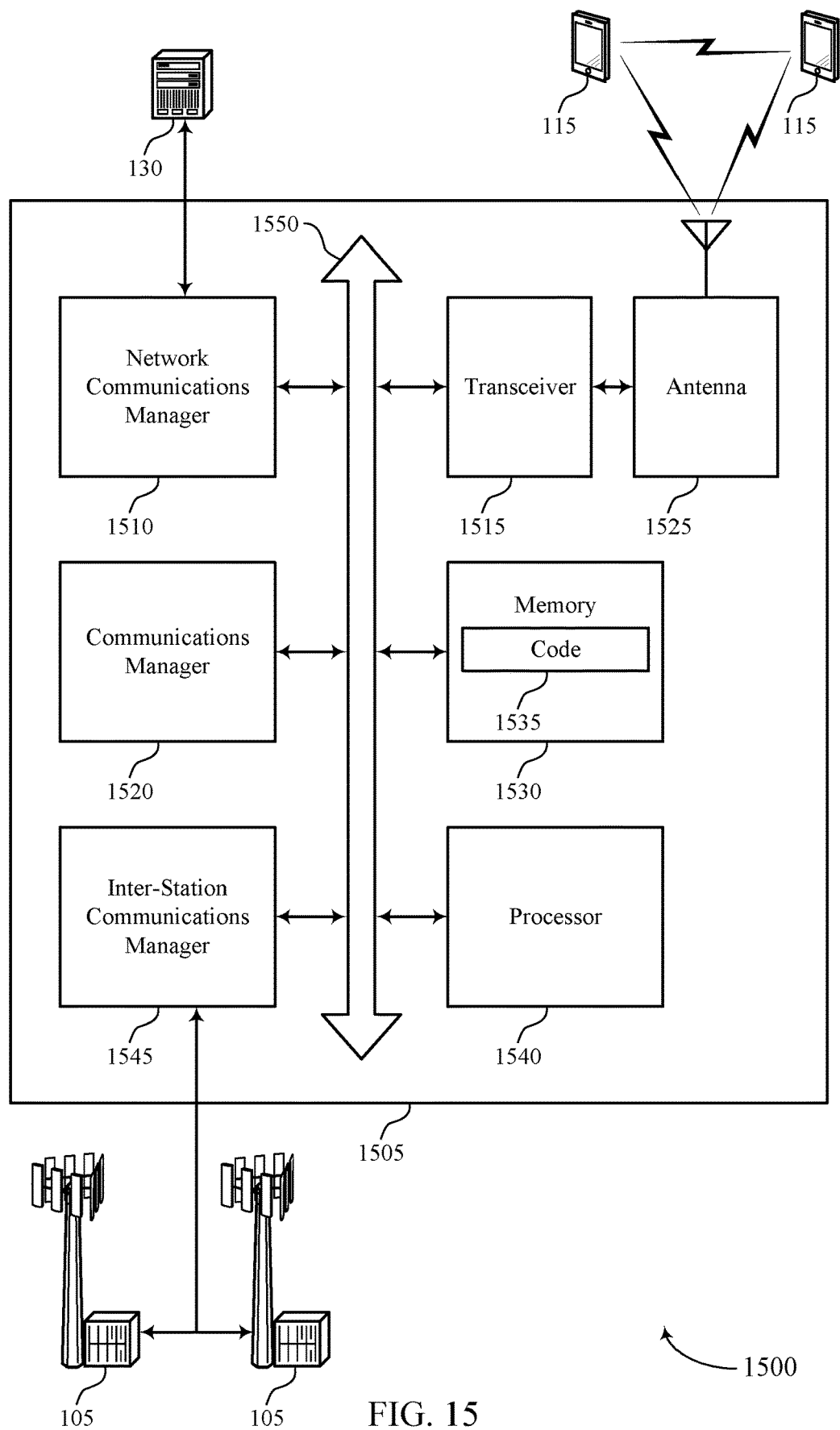
FIG. 15 shows a diagram of a system including a device that supports techniques for feedback metrics associated with dual-polarized beamforming transmissions in accordance with one or more aspects of the present disclosure.

FIG. 15 shows a diagram of a system 1500 including a device 1505 that supports techniques for feedback metrics associated with dual-polarized beamforming transmissions in accordance with one or more aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for feedback metrics associated with dual-polarized beamforming transmissions). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, first control signaling to initialize a beam sweep procedure. The communications manager 1520 may be configured as or otherwise support a means for receiving, from the UE, a report including one or more polarization parameters relating to a coverage region for communications between the base station and the UE, the one or more polarization parameters associated with the beam sweep procedure. The communications manager 1520 may be configured as or otherwise support a means for transmitting, to the UE, second control signaling indicating a beam configuration for the communications between the base station and the UE, the beam configuration based on the report.

By including or configuring the communications manager 1520 in accordance with examples as described herein, the device 1505 may support techniques for improved communication reliability, reduced latency, improved user experience related to reduced processing, reduced power consumption, more efficient utilization of communication resources, improved coordination between devices, improved utilization of processing capability, etc.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for feedback metrics associated with dual-polarized beamforming transmissions as described herein, or the processor 1540 and the memory 1530 may be otherwise configured to perform or support such operations.

Figure 16:
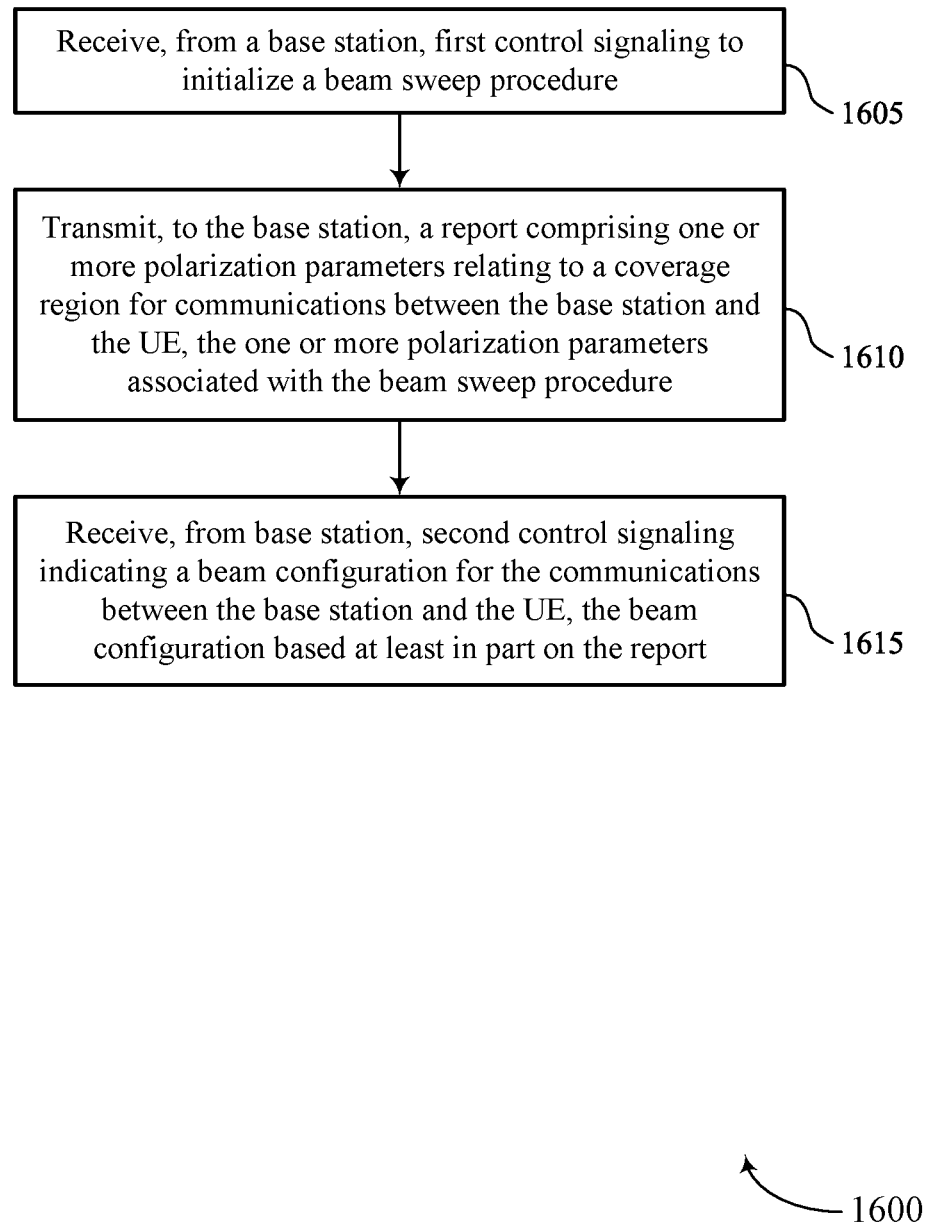
FIGS. 16 through 21 show flowcharts illustrating methods that support techniques for feedback metrics associated with dual-polarized beamforming transmissions in accordance with one or more aspects of the present disclosure.

FIG. 16 shows a flowchart illustrating a method 1600 that supports techniques for feedback metrics associated with dual-polarized beamforming transmissions in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform one or more aspects of the described functions using special-purpose hardware.

At 1605, the method may include receiving, from a base station, first control signaling to initialize a beam sweep procedure. The operations of 1605 may be performed in accordance with examples as disclosed herein. In some examples, one or more aspects of the operations of 1605 may be performed by a control signaling manager 1025 as described with reference to FIG. 10.

At 1610, the method may include transmitting, to the base station, a report including one or more polarization parameters relating to a coverage region for communications between the base station and the UE, the one or more polarization parameters associated with the beam sweep procedure. The operations of 1610 may be performed in accordance with examples as disclosed herein. In some examples, one or more aspects of the operations of 1610 may be performed by a report manager 1030 as described with reference to FIG. 10.

At 1615, the method may include receiving, from base station, second control signaling indicating a beam configuration for the communications between the base station and the UE, the beam configuration based on the report. The operations of 1615 may be performed in accordance with examples as disclosed herein. In some examples, one or more aspects of the operations of 1615 may be performed by a control signaling manager 1025 as described with reference to FIG. 10.

Figure 17:
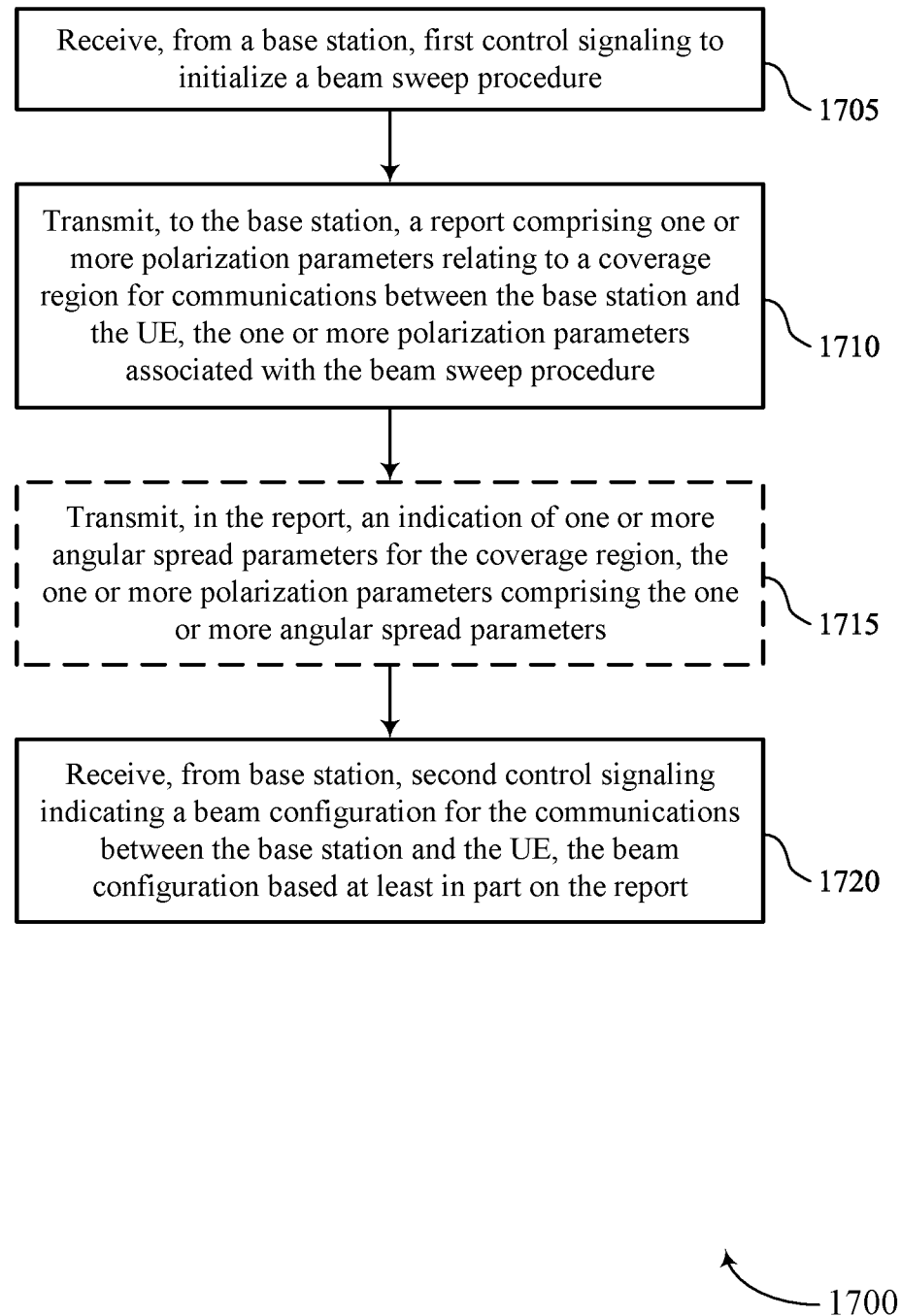

FIG. 17 shows a flowchart illustrating a method 1700 that supports techniques for feedback metrics associated with dual-polarized beamforming transmissions in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform one or more aspects of the described functions using special-purpose hardware.

At 1705, the method may include receiving, from a base station, first control signaling to initialize a beam sweep procedure. The operations of 1705 may be performed in accordance with examples as disclosed herein. In some examples, one or more aspects of the operations of 1705 may be performed by a control signaling manager 1025 as described with reference to FIG. 10.

At 1710, the method may include transmitting, to the base station, a report including one or more polarization parameters relating to a coverage region for communications between the base station and the UE, the one or more polarization parameters associated with the beam sweep procedure. The operations of 1710 may be performed in accordance with examples as disclosed herein. In some examples, one or more aspects of the operations of 1710 may be performed by a report manager 1030 as described with reference to FIG. 10.

At 1715, the method may include transmitting, in the report, an indication of one or more angular spread parameters for the coverage region, the one or more polarization parameters including the one or more angular spread parameters. The operations of 1715 may be performed in accordance with examples as disclosed herein. In some examples, one or more aspects of the operations of 1715 may be performed by a report manager 1030 as described with reference to FIG. 10.

At 1720, the method may include receiving, from base station, second control signaling indicating a beam configuration for the communications between the base station and the UE, the beam configuration based on the report. The operations of 1720 may be performed in accordance with examples as disclosed herein. In some examples, one or more aspects of the operations of 1720 may be performed by a control signaling manager 1025 as described with reference to FIG. 10.

Figure 18:
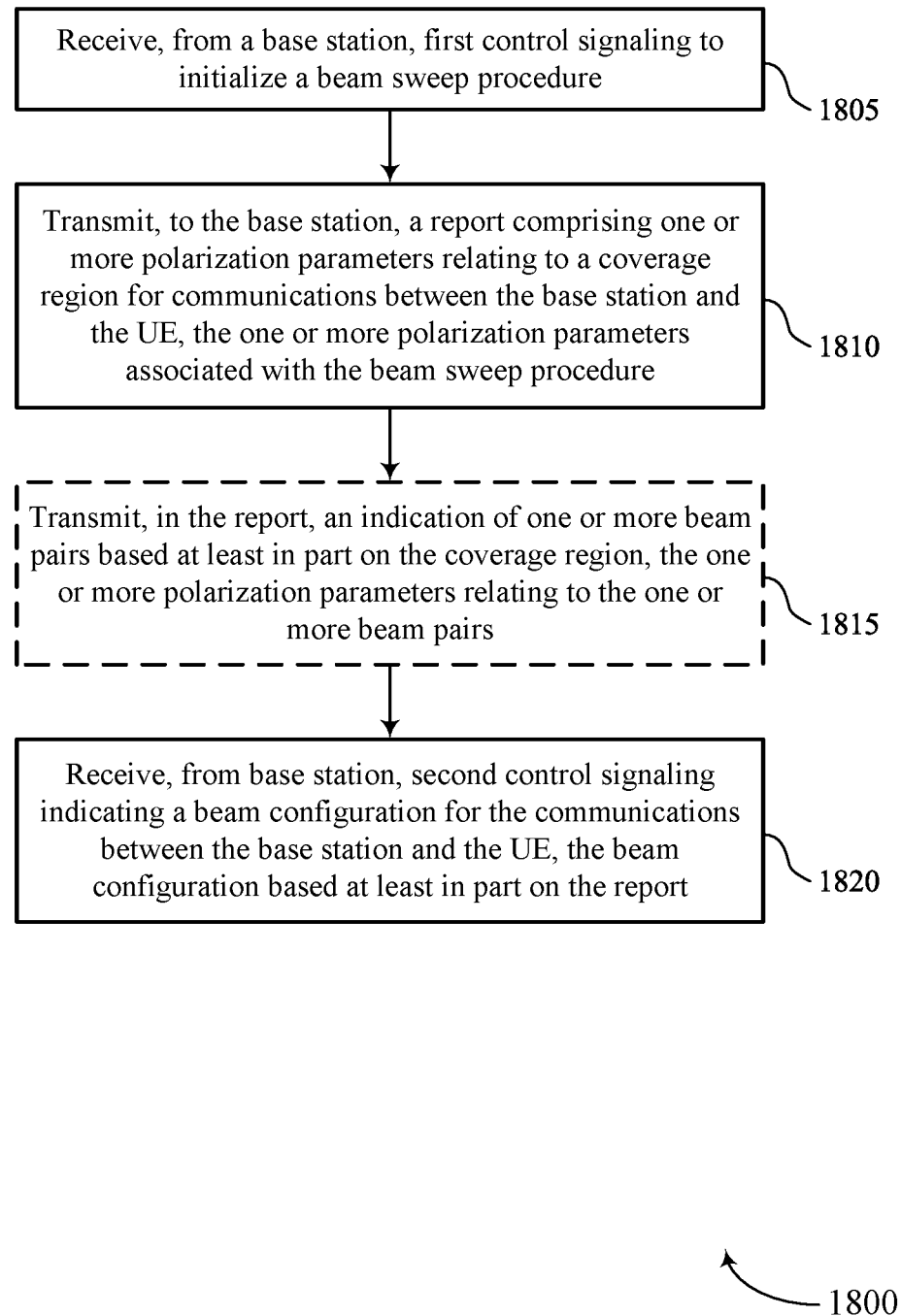

FIG. 18 shows a flowchart illustrating a method 1800 that supports techniques for feedback metrics associated with dual-polarized beamforming transmissions in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform one or more aspects of the described functions using special-purpose hardware.

At 1805, the method may include receiving, from a base station, first control signaling to initialize a beam sweep procedure. The operations of 1805 may be performed in accordance with examples as disclosed herein. In some examples, one or more aspects of the operations of 1805 may be performed by a control signaling manager 1025 as described with reference to FIG. 10.

At 1810, the method may include transmitting, to the base station, a report including one or more polarization parameters relating to a coverage region for communications between the base station and the UE, the one or more polarization parameters associated with the beam sweep procedure. The operations of 1810 may be performed in accordance with examples as disclosed herein. In some examples, one or more aspects of the operations of 1810 may be performed by a report manager 1030 as described with reference to FIG. 10.

At 1815, the method may include transmitting, in the report, an indication of one or more beam pairs based on the coverage region, the one or more polarization parameters relating to the one or more beam pairs. The operations of 1815 may be performed in accordance with examples as disclosed herein. In some examples, one or more aspects of the operations of 1815 may be performed by a report manager 1030 as described with reference to FIG. 10.

At 1820, the method may include receiving, from base station, second control signaling indicating a beam configuration for the communications between the base station and the UE, the beam configuration based on the report. The operations of 1820 may be performed in accordance with examples as disclosed herein. In some examples, one or more aspects of the operations of 1820 may be performed by a control signaling manager 1025 as described with reference to FIG. 10.

Figure 19:
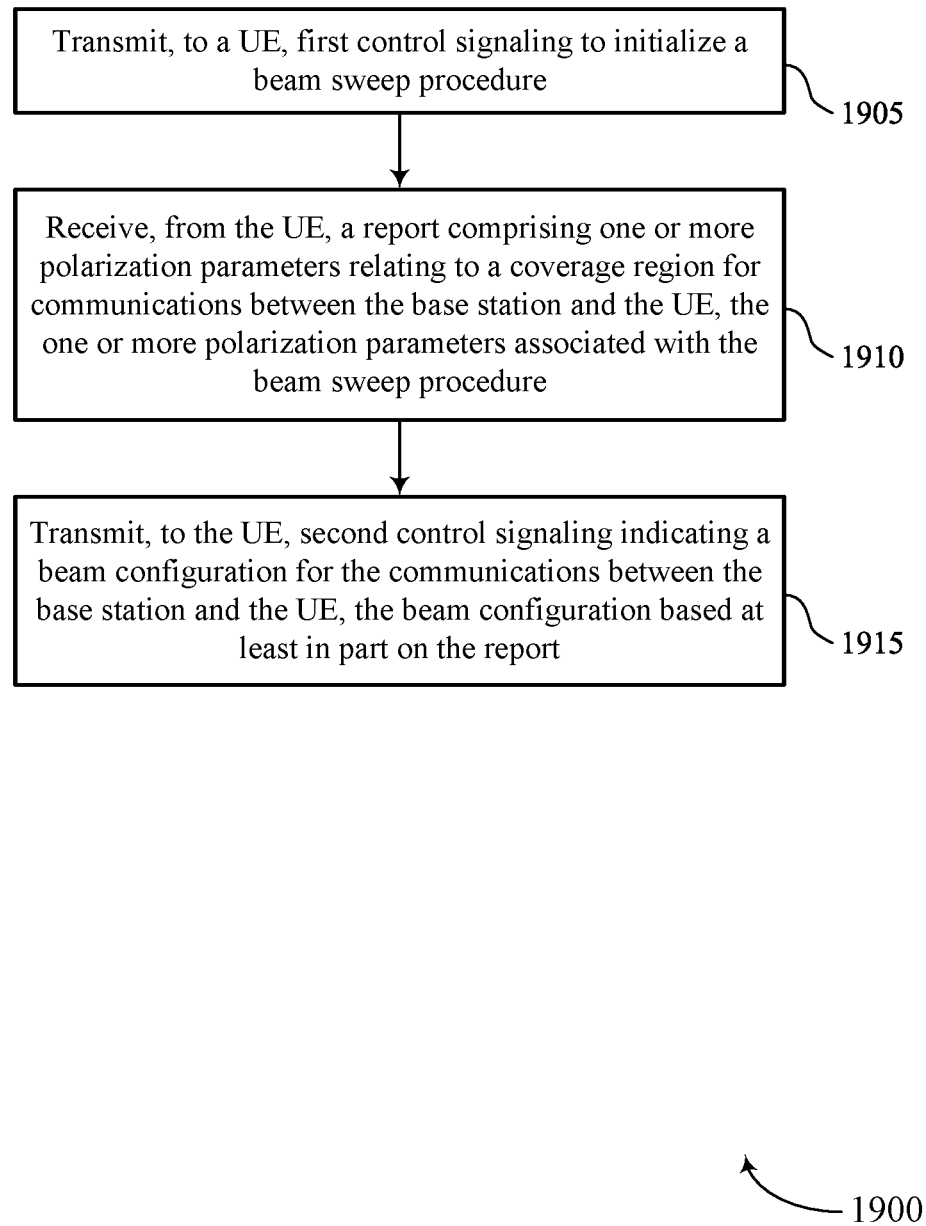

FIG. 19 shows a flowchart illustrating a method 1900 that supports techniques for feedback metrics associated with dual-polarized beamforming transmissions in accordance with one or more aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform one or more aspects of the described functions using special-purpose hardware.

At 1905, the method may include transmitting, to a UE, first control signaling to initialize a beam sweep procedure. The operations of 1905 may be performed in accordance with examples as disclosed herein. In some examples, one or more aspects of the operations of 1905 may be performed by a control signaling component 1425 as described with reference to FIG. 14.

At 1910, the method may include receiving, from the UE, a report including one or more polarization parameters relating to a coverage region for communications between the base station and the UE, the one or more polarization parameters associated with the beam sweep procedure. The operations of 1910 may be performed in accordance with examples as disclosed herein. In some examples, one or more aspects of the operations of 1910 may be performed by a report component 1430 as described with reference to FIG. 14.

At 1915, the method may include transmitting, to the UE, second control signaling indicating a beam configuration for the communications between the base station and the UE, the beam configuration based on the report. The operations of 1915 may be performed in accordance with examples as disclosed herein. In some examples, one or more aspects of the operations of 1915 may be performed by a control signaling component 1425 as described with reference to FIG. 14.

Figure 20:
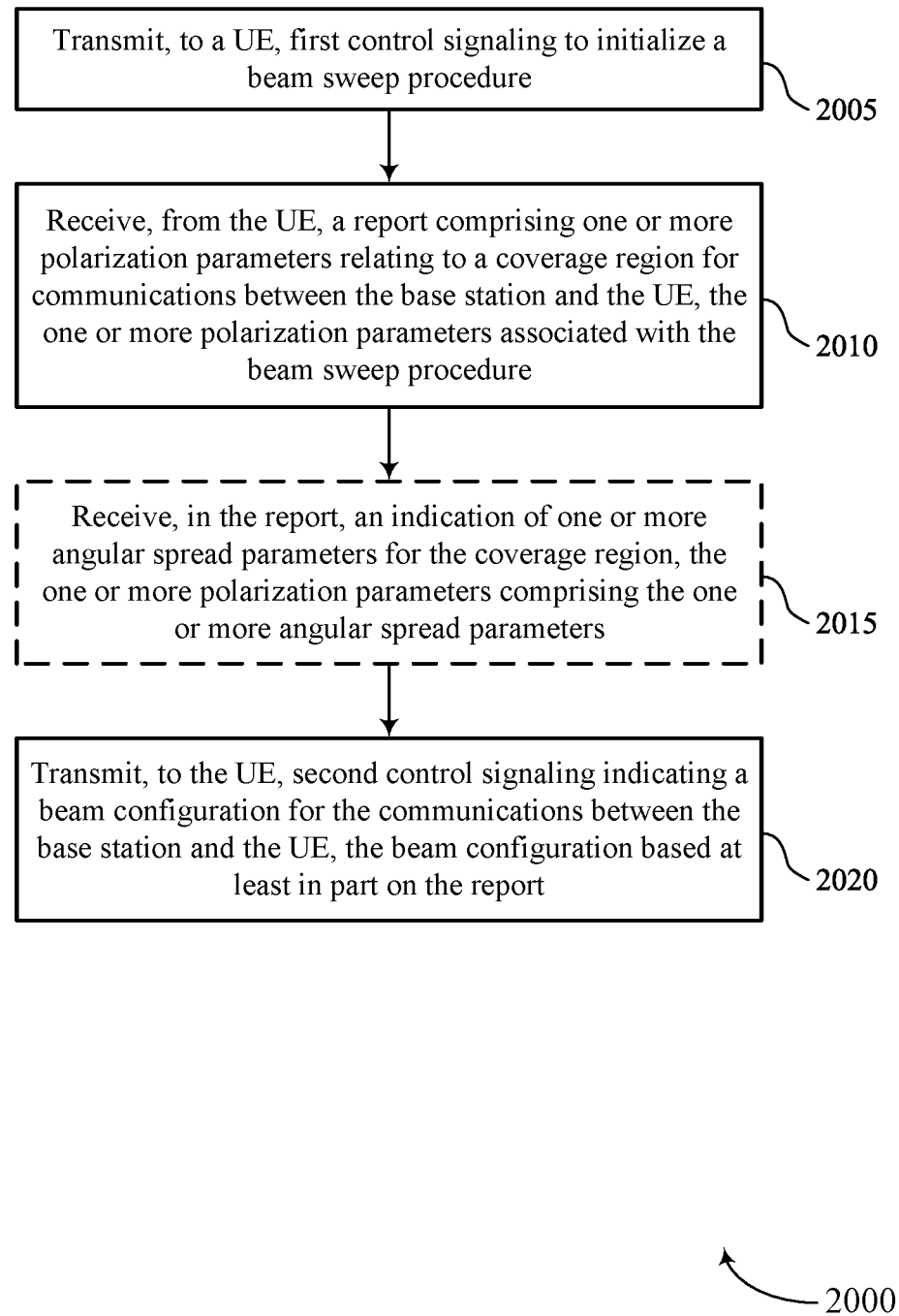

FIG. 20 shows a flowchart illustrating a method 2000 that supports techniques for feedback metrics associated with dual-polarized beamforming transmissions in accordance with one or more aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform one or more aspects of the described functions using special-purpose hardware.

At 2005, the method may include transmitting, to a UE, first control signaling to initialize a beam sweep procedure. The operations of 2005 may be performed in accordance with examples as disclosed herein. In some examples, one or more aspects of the operations of 2005 may be performed by a control signaling component 1425 as described with reference to FIG. 14.

At 2010, the method may include receiving, from the UE, a report including one or more polarization parameters relating to a coverage region for communications between the base station and the UE, the one or more polarization parameters associated with the beam sweep procedure. The operations of 2010 may be performed in accordance with examples as disclosed herein. In some examples, one or more aspects of the operations of 2010 may be performed by a report component 1430 as described with reference to FIG. 14.

At 2015, the method may include receiving, in the report, an indication of one or more angular spread parameters for the coverage region, the one or more polarization parameters including the one or more angular spread parameters. The operations of 2015 may be performed in accordance with examples as disclosed herein. In some examples, one or more aspects of the operations of 2015 may be performed by a report component 1430 as described with reference to FIG. 14.

At 2020, the method may include transmitting, to the UE, second control signaling indicating a beam configuration for the communications between the base station and the UE, the beam configuration based on the report. The operations of 2020 may be performed in accordance with examples as disclosed herein. In some examples, one or more aspects of the operations of 2020 may be performed by a control signaling component 1425 as described with reference to FIG. 14.

Figure 21:
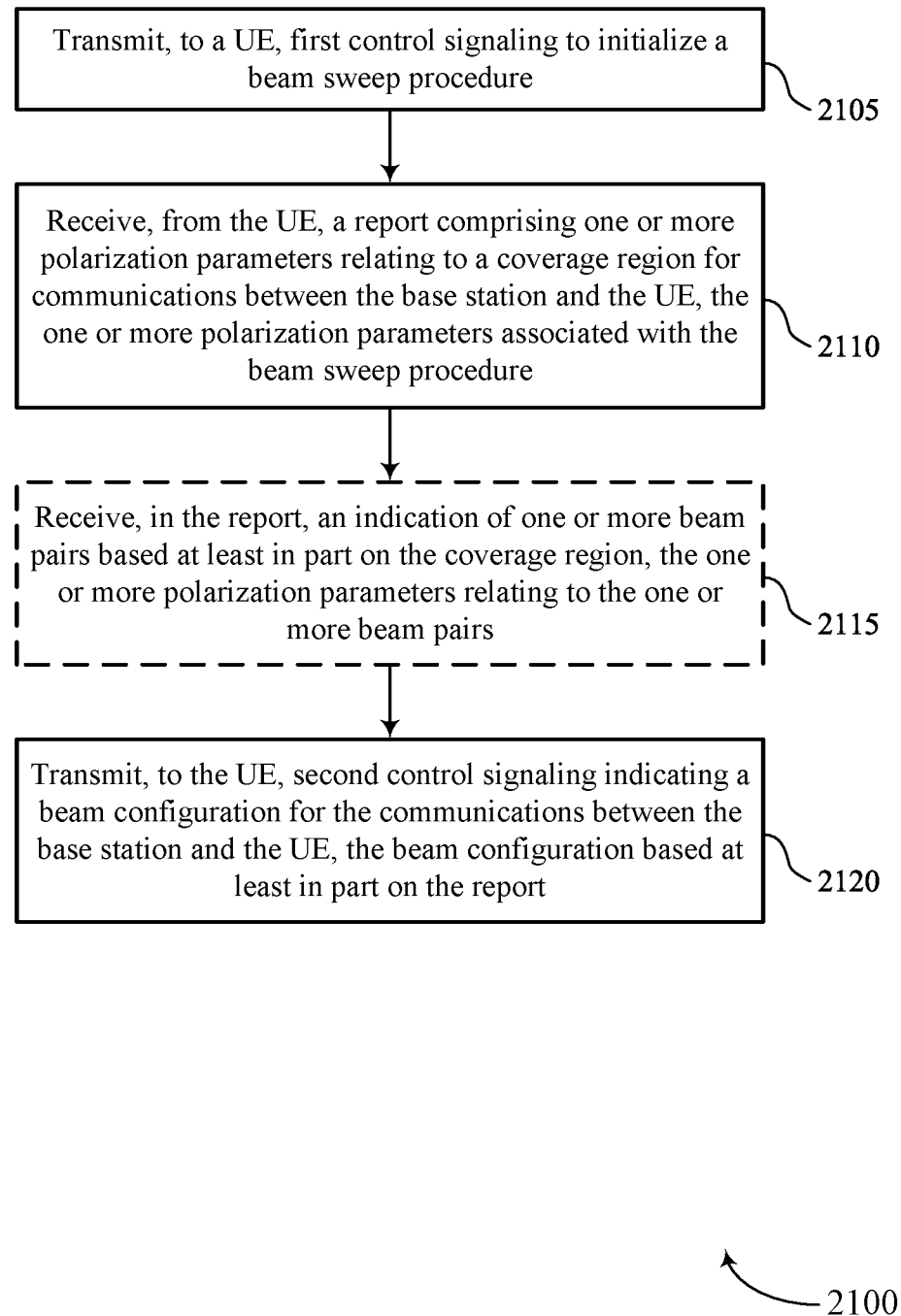

FIG. 21 shows a flowchart illustrating a method 2100 that supports techniques for feedback metrics associated with dual-polarized beamforming transmissions in accordance with one or more aspects of the present disclosure. The operations of the method 2100 may be implemented by a base station or its components as described herein. For example, the operations of the method 2100 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform one or more aspects of the described functions using special-purpose hardware.

At 2105, the method may include transmitting, to a UE, first control signaling to initialize a beam sweep procedure. The operations of 2105 may be performed in accordance with examples as disclosed herein. In some examples, one or more aspects of the operations of 2105 may be performed by a control signaling component 1425 as described with reference to FIG. 14.

At 2110, the method may include receiving, from the UE, a report including one or more polarization parameters relating to a coverage region for communications between the base station and the UE, the one or more polarization parameters associated with the beam sweep procedure. The operations of 2110 may be performed in accordance with examples as disclosed herein. In some examples, one or more aspects of the operations of 2110 may be performed by a report component 1430 as described with reference to FIG. 14.

At 2115, the method may include receiving, in the report, an indication of one or more beam pairs based on the coverage region, the one or more polarization parameters relating to the one or more beam pairs. The operations of 2115 may be performed in accordance with examples as disclosed herein. In some examples, one or more aspects of the operations of 2115 may be performed by a report component 1430 as described with reference to FIG. 14.

At 2120, the method may include transmitting, to the UE, second control signaling indicating a beam configuration for the communications between the base station and the UE, the beam configuration based on the report. The operations of 2120 may be performed in accordance with examples as disclosed herein. In some examples, one or more aspects of the operations of 2120 may be performed by a control signaling component 1425 as described with reference to FIG. 14.

The following provides an overview of aspects of the present disclosure:

Aspect 1: A method for wireless communications at a UE, comprising: receiving, from a base station, first control signaling to initialize a beam sweep procedure; transmitting, to the base station, a report comprising one or more polarization parameters relating to a coverage region for communications between the base station and the UE, the one or more polarization parameters associated with the beam sweep procedure; and receiving, from base station, second control signaling indicating a beam configuration for the communications between the base station and the UE, the beam configuration based at least in part on the report.

Aspect 2: The method of aspect 1, the transmitting the report comprising: transmitting, in the report, an indication of one or more angular spread parameters for the coverage region, the one or more polarization parameters comprising the one or more angular spread parameters.

Aspect 3: The method of any of aspects 1 through 2, the transmitting the report comprising: transmitting, in the report, an indication of one or more beam pairs based at least in part on the coverage region, the one or more polarization parameters relating to the one or more beam pairs.

Aspect 4: The method of aspect 3, wherein the one or more beam pairs comprise a beam pair that is indicated based at least in part on an orthogonality parameter associated with the beam pair, the one or more polarization parameters comprising the orthogonality parameter.

Aspect 5: The method of aspect 4, wherein the orthogonality parameter identifies a loss in orthogonality for the beam pair.

Aspect 6: The method of any of aspects 3 through 5, wherein the one or more beam pairs comprise a first beam pair that is selected based at least in part on the beam sweep procedure and a second beam pair that is identified based at least in part on the one or more polarization parameters, the one or more polarization parameters comprising a first orthogonality parameter associated with the first beam pair, a second orthogonality parameter associated with the second beam pair, or both.

Aspect 7: The method of any of aspects 1 through 6, further comprising: receiving, in accordance with the beam configuration, a first message using a first beam with a first polarization; and receiving, in accordance with the beam configuration, a second message using a second beam with a second polarization different from the first polarization.

Aspect 8: The method of any of aspects 1 through 7, further comprising: determining an orthogonality parameter associated with a beam pair that is selected based at least in part on the beam sweep procedure, the one or more polarization parameters comprising the orthogonality parameter.

Aspect 9: The method of aspect 8, further comprising: comparing the orthogonality parameter with a threshold, wherein the report is transmitted based at least in part on the comparing.

Aspect 10: The method of any of aspects 8 through 9, wherein the orthogonality parameter comprises an envelope correlation coefficient corresponding to a correlation between a first component of a first electric field associated with a first beam of the beam pair and a second component of a second electric field associated with a second beam of the beam pair, the first electric field emitted at a first antenna array of the base station and the second electric field emitted at a second antenna array of the base station.

Aspect 11: The method of any of aspects 1 through 10, wherein the one or more polarization parameters are based at least in part on a frequency that is used for communications between the base station and the UE.

Aspect 12: A method for wireless communications at a base station, comprising: transmitting, to a UE, first control signaling to initialize a beam sweep procedure; receiving, from the UE, a report comprising one or more polarization parameters relating to a coverage region for communications between the base station and the UE, the one or more polarization parameters associated with the beam sweep procedure; and transmitting, to the UE, second control signaling indicating a beam configuration for the communications between the base station and the UE, the beam configuration based at least in part on the report.

Aspect 13: The method of aspect 12, the receiving the report comprising: receiving, in the report, an indication of one or more angular spread parameters for the coverage region, the one or more polarization parameters comprising the one or more angular spread parameters.

Aspect 14: The method of any of aspects 12 through 13, the receiving the report comprising: receiving, in the report, an indication of one or more beam pairs based at least in part on the coverage region, the one or more polarization parameters relating to the one or more beam pairs.

Aspect 15: The method of aspect 14, wherein the one or more beam pairs comprise a beam pair that is indicated based at least in part on an orthogonality parameter associated with the beam pair, the one or more polarization parameters comprising the orthogonality parameter.

Aspect 16: The method of aspect 15, wherein the orthogonality parameter identifies a loss in orthogonality for the beam pair.

Aspect 17: The method of any of aspects 14 through 16, wherein the one or more beam pairs comprise a first beam pair that is selected based at least in part on the beam sweep procedure and a second beam pair that is identified based at least in part on the one or more polarization parameters, the one or more polarization parameters comprising a first orthogonality parameter associated with the first beam pair, a second orthogonality parameter associated with the second beam pair, or both.

Aspect 18: The method of any of aspects 12 through 17, further comprising: transmitting, in accordance with the beam configuration, a first message using a first beam with a first polarization; and transmitting, in accordance with the beam configuration, a second message using a second beam with a second polarization different from the first polarization.

Aspect 19: The method of any of aspects 12 through 18, further comprising: determining an orthogonality parameter associated with a beam pair that is selected based at least in part on the receiving the report, the one or more polarization parameters comprising the orthogonality parameter.

Aspect 20: The method of aspect 19, wherein the report comprises a result of a comparison between the orthogonality parameter and a threshold.

Aspect 21: The method of any of aspects 19 through 20, wherein the orthogonality parameter comprises an envelope correlation coefficient corresponding to a correlation between a first component of a first electric field associated with a first beam of the beam pair and a second component of a second electric field associated with a second beam of the beam pair, the first electric field emitted at a first antenna array of the base station and the second electric field emitted at a second antenna array of the base station.

Aspect 22: The method of any of aspects 12 through 21, wherein the one or more polarization parameters are based at least in part on a frequency that is used for communications between the base station and the UE.

Aspect 23: An apparatus for wireless communication at a UE, comprising a processor and memory coupled to the processor, the processor and memory configured to perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communication at a base station, comprising a processor and memory coupled to the processor, the processor and memory configured to perform a method of any of aspects 12 through 22.

Aspect 27: An apparatus for wireless communications at a base station, comprising at least one means for performing a method of any of aspects 12 through 22.

Aspect 28: A non-transitory computer-readable medium storing code for wireless communications at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, one or more aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      receive first control signaling to initialize a beam sweep procedure;
      transmit a report that comprises one or more polarization parameters used for communications at the UE, wherein the one or more polarization parameters comprise one or more angular spread parameters associated with the beam sweep procedure, and wherein the one or more angular spread parameters indicate an angular coverage region that maintains orthogonality between one or more beam pairs associated with the UE; and
      receive second control signaling that indicates a beam configuration for the communications at the UE, the beam configuration based at least in part on the report.

2. The apparatus of claim 1, wherein, to transmit the report, the one or more processors are configured to cause the UE to:
   transmit, in the report, an indication of the one or more beam pairs associated with the UE, the one or more beam pairs identified from the beam sweep procedure.

3. The apparatus of claim 2, wherein the one or more beam pairs are associated with a coverage region of a network device, and the one or more polarization parameters relate to the one or more beam pairs.

4. The apparatus of claim 1, wherein the one or more polarization parameters comprise one or more orthogonality parameters that indicate a loss in the orthogonality between the one or more beam pairs.

5. The apparatus of claim 4, wherein the one or more orthogonality parameters comprise an envelope correlation coefficient that corresponds to a correlation between a first component of a first electric field associated with a first beam of the one or more beam pairs and a second component of a second electric field associated with a second beam of the one or more beam pairs.

6. The apparatus of claim 1, wherein:
   the one or more beam pairs comprise a first beam pair that is selected based at least in part on the beam sweep procedure, a second beam pair that is identified based at least in part on the one or more polarization parameters, or both; and
   the one or more polarization parameters comprise a first orthogonality parameter associated with the first beam pair, a second orthogonality parameter associated with the second beam pair, or both.

7. The apparatus of claim 1, wherein the UE further comprises one or more antennas, and wherein the one or more antennas and the one or more processors are configured to cause the UE to:
   receive, in accordance with the beam configuration, a first message via a first beam with a first polarization; and
   receive, in accordance with the beam configuration, a second message via a second beam with a second polarization different from the first polarization.

8. An apparatus for wireless communication at a network device, comprising:
   one or more memories; and one or more processors coupled with the one or more memories and configured to cause the network device to:

output first control signaling to initialize a beam sweep procedure;

obtain a report that comprises one or more polarization parameters used for communications at the network device, wherein the one or more polarization parameters comprise one or more angular spread parameters associated with the beam sweep procedure, and wherein the one or more angular spread parameters indicate an angular coverage region that maintains orthogonality between one or more beam pairs associated with the network device; and output second control signaling that indicates a beam configuration for the communications at the network device, the beam configuration based at least in part on the report.

9. The apparatus of claim 8, wherein, to obtain the report, the one or more processors are configured to cause the network device to:

obtain, in the report, an indication of the one or more beam pairs associated with the network device, the one or more beam pairs identified from the beam sweep procedure.

10. The apparatus of claim 9, wherein the one or more beam pairs are associated with a coverage region of the network device, and the one or more polarization parameters relate to the one or more beam pairs.

11. The apparatus of claim 8, wherein the one or more polarization parameters comprise one or more orthogonality parameters that indicate a loss in the orthogonality between the one or more beam pairs.

12. The apparatus of claim 11, wherein the one or more orthogonality parameters comprise an envelope correlation coefficient that corresponds to a correlation between a first component of a first electric field associated with a first beam of the one or more beam pairs and a second component of a second electric field associated with a second beam of the one or more beam pairs, the first electric field emitted at a first antenna array of the network device and the second electric field emitted at a second antenna array of the network device.

13. The apparatus of claim 8, wherein:

the one or more beam pairs comprise a first beam pair that is selected based at least in part on the beam sweep procedure, a second beam pair that is identified based at least in part on the one or more polarization parameters, or both, and, the one or more polarization parameters comprise a first orthogonality parameter associated with the first beam pair, a second orthogonality parameter associated with the second beam pair, or both.

14. The apparatus of claim 8, wherein the network device further comprises one or more antennas that are operable to cause the network device to:

output, in accordance with the beam configuration, a first message via a first beam with a first polarization; and output, in accordance with the beam configuration, a second message via a second beam with a second polarization different from the first polarization.

15. A method for wireless communications at a user equipment (UE), comprising:

receiving first control signaling to initialize a beam sweep procedure;

transmitting a report that comprises one or more polarization parameters used for communications at the UE, the one or more polarization parameters comprising one or more angular spread parameters associated with the beam sweep procedure, the one or more angular spread parameters indicating an angular coverage region that maintains orthogonality between one or more beam pairs associated with the UE; and receiving second control signaling that indicates a beam configuration for the communications at the UE, the beam configuration based at least in part on the report.

16. The method of claim 15, the transmitting comprising:

transmitting, in the report, an indication of the one or more beam pairs associated with the UE, the one or more beam pairs identified from the beam sweep procedure.

17. The method of claim 16, the one or more beam pairs being associated with a coverage region at a network device, and the one or more polarization parameters relating to the one or more beam pairs.

18. The method of claim 15, the one or more polarization parameters comprising one or more orthogonality parameters that indicate a loss in the orthogonality between the one or more beam pairs.

19. The method of claim 18, the one or more orthogonality parameters comprising an envelope correlation coefficient that corresponds to a correlation between a first component of a first electric field associated with a first beam of the one or more beam pairs and a second component of a second electric field associated with a second beam of the one or more beam pairs.

20. The method of claim 15, the one or more beam pairs comprising a first beam pair that is selected based at least in part on the beam sweep procedure, a second beam pair that is identified based at least in part on the one or more polarization parameters, or both, and the one or more polarization parameters comprising a first orthogonality parameter associated with the first beam pair, a second orthogonality parameter associated with the second beam pair, or both.

21. A method for wireless communication at a network device, comprising:

outputting first control signaling to initialize a beam sweep procedure;

obtaining a report that comprises one or more polarization parameters used for communications at the network device, the one or more polarization parameters comprising one or more angular spread parameters associated with the beam sweep procedure, and the one or more angular spread parameters indicating an angular coverage region that maintains orthogonality between one or more beam pairs associated with the network device; and outputting second control signaling that indicates a beam configuration for the communications at the network device, the beam configuration based at least in part on the report.

22. The method of claim 21, the obtaining comprising:

obtaining, in the report, an indication of the one or more beam pairs associated with the network device, the one or more beam pairs identified from the beam sweep procedure.

23. The method of claim 22, the one or more beam pairs being associated with a coverage region of the network device, and the one or more polarization parameters relating to the one or more beam pairs.

24. The method of claim 22, the one or more polarization parameters comprising one or more orthogonality parameters that indicate a loss in the orthogonality between the one or more beam pairs.

25. A non-transitory computer-readable medium storing code for wireless communications at a user equipment (UE), the code comprising instructions executable by one or more processors to cause the UE to:
- receive first control signaling to initialize a beam sweep procedure;
- transmit a report that comprises one or more polarization parameters used for communications at the UE, the one or more polarization parameters comprising one or more angular spread parameters associated with the beam sweep procedure, the one or more angular spread parameters indicating an angular coverage region that maintains orthogonality between one or more beam pairs associated with the UE; and
- receive second control signaling that indicates a beam configuration for the communications at the UE, the beam configuration based at least in part on the report.

26. A non-transitory computer-readable medium storing code for wireless communication at a network device, the code comprising instructions executable by one or more processors to cause the network device to:
- output first control signaling to initialize a beam sweep procedure;
- obtain a report that comprises one or more polarization parameters used for communications at the network device, the one or more polarization parameters comprising one or more angular spread parameters associated with the beam sweep procedure, and the one or more angular spread parameters indicating an angular coverage region that maintains orthogonality between one or more beam pairs associated with the network device; and
- output second control signaling that indicates a beam configuration for the communications at the network device, the beam configuration based at least in part on the report.

* * * * *